US007784758B2

(12) United States Patent
Oh et al.

(10) Patent No.: US 7,784,758 B2
(45) Date of Patent: Aug. 31, 2010

(54) MOTORIZED MOUNT TO PIVOT A MONITOR

(76) Inventors: Sung I. Oh, 710 Quail Valley La., West Covina, CA (US) 91791; Ken Nguyen, 5830 E. Camino Manzano, Anaheim Hills, CA (US) 92807

( * ) Notice: Subject to any disclaimer, the term of this patent is extended or adjusted under 35 U.S.C. 154(b) by 0 days.

(21) Appl. No.: 12/647,558

(22) Filed: Dec. 28, 2009

(65) Prior Publication Data

US 2010/0096519 A1    Apr. 22, 2010

Related U.S. Application Data

(62) Division of application No. 12/250,455, filed on Oct. 13, 2008, now Pat. No. 7,661,642.

(60) Provisional application No. 60/979,103, filed on Oct. 11, 2007, provisional application No. 60/981,126, filed on Oct. 19, 2007, provisional application No. 60/983,162, filed on Oct. 27, 2007, provisional application No. 61/012,497, filed on Dec. 10, 2007, provisional application No. 61/054,491, filed on May 20, 2008.

(51) Int. Cl.
*E04G 3/00* (2006.01)

(52) U.S. Cl. .................... 248/274.1; 248/917; 248/922

(58) Field of Classification Search .............. 248/274.1, 248/371, 292.14, 299.1, 289.11, 298.1, 276.1, 248/284.1, 917, 919–923; 348/825
See application file for complete search history.

(56) References Cited

U.S. PATENT DOCUMENTS

| | | | |
|---|---|---|---|
| 6,905,101 B1 * | 6/2005 | Dittmer | 248/274.1 |
| 7,380,760 B2 * | 6/2008 | Dittmer | 248/278.1 |
| 7,395,996 B2 * | 7/2008 | Dittmer | 248/291.1 |
| 7,398,950 B2 * | 7/2008 | Hung | 248/276.1 |
| 7,438,269 B2 * | 10/2008 | Pfister et al. | 248/292.14 |
| 2006/0065800 A1 * | 3/2006 | Bremmon | 248/274.1 |
| 2006/0231711 A1 * | 10/2006 | Shin | 248/291.1 |
| 2007/0262215 A1 * | 11/2007 | Tan | 248/201 |
| 2008/0105807 A1 * | 5/2008 | Oh | 248/278.1 |
| 2008/0156949 A1 * | 7/2008 | Sculler et al. | 248/220.21 |
| 2009/0050763 A1 * | 2/2009 | Dittmer | 248/284.1 |

* cited by examiner

*Primary Examiner*—Ramon O Ramirez

(57) ABSTRACT

A motorized mount system includes first and second mount brackets, where one or both of the mount brackets is motorized to pivot a monitor. The motorized bracket includes a motorized actuator system that releaseably engages with the monitor. The actuator system includes a moving block that releaseably pushes the monitor to tilt up, and uses the weight of the monitor to tilt down the monitor. The monitor can be separated with the moving block so that if a foreign object gets between the bottom end of the monitor and the wall, the foreign object needs to counteract the weight of the monitor but not the force due to the motor.

6 Claims, 25 Drawing Sheets

MOTORIZED MOUNT TO PIVOT A MONITOR

RELATED APPLICATIONS

This application is a divisional application of a U.S. non-provisional application Ser. No. 12/250,455, filed Oct. 13, 2008, now U.S. Pat. No. 7,661,642 which claims priority to U.S. provisional application Ser. Nos.: (1) 60/979,103, filed Oct. 11, 2007; (2) 60/981,126, filed Oct. 19, 2007; (3) 60/983,162, filed Oct. 27, 2007; (4) 61/012,497, filed Dec. 10, 2007; and (5) 61/054,491, filed May 20, 2008, which are all hereby incorporated by references.

FIELD OF THE INVENTION

This invention is directed to a mount system that is adapted to couple to a rear side of a monitor and reposition the viewing angle of the monitor remotely, and in particular, tilt the monitor through a motorized action.

BACKGROUND OF THE INVENTION

Flat panel monitors such as computer monitors, LCD, plasma, slim televisions, and the like (collectively referred to as "monitor(s)") are becoming popular because they can be mounted onto a wall to save floor space and for their aesthetically pleasing appearance. In many applications, the monitor is placed on a table, mounted to a wall, or even hanging from a ceiling. In these applications, however, in order to reposition the monitor, the viewer needs to walk over to the monitor and physically move the monitor to a new viewing angle. Repositioning a monitor, however, is not always feasible because of the weight of the monitor makes it difficult to move or the monitor may be located high above the floor so that the viewer may not be able to reach it without a ladder for example. Accordingly, there is a need to be able to reposition the monitor more easily.

INVENTION SUMMARY

This invention is directed to a motorized mount system to pivot a monitor. The mount system includes first and second mount brackets. One end of the mount brackets are designed to attach to the rear side of the monitor, and the opposite end of the mount brackets are designed to attach to a supporting surface such as a wall or a wall bracket. One or both of the mount brackets may be motorized. When the motorized mount system is in use, the first and second mount brackets may be separated along the longitudinal axis of the monitor.

The motorized bracket includes a motorized actuator system that releaseably engages with the monitor. The actuator system includes a moving block that releaseably pushes the monitor to tilt up. To tilt down the monitor, the moving block retracts to allow the weight of the monitor to drop the monitor downwards. With the moving block being releaseably engaged with the monitor, the monitor can be separated with the moving block so that if a foreign object gets between the bottom end of the monitor and the wall, the foreign object needs to counteract the weight of the monitor but not the force due to the motor.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
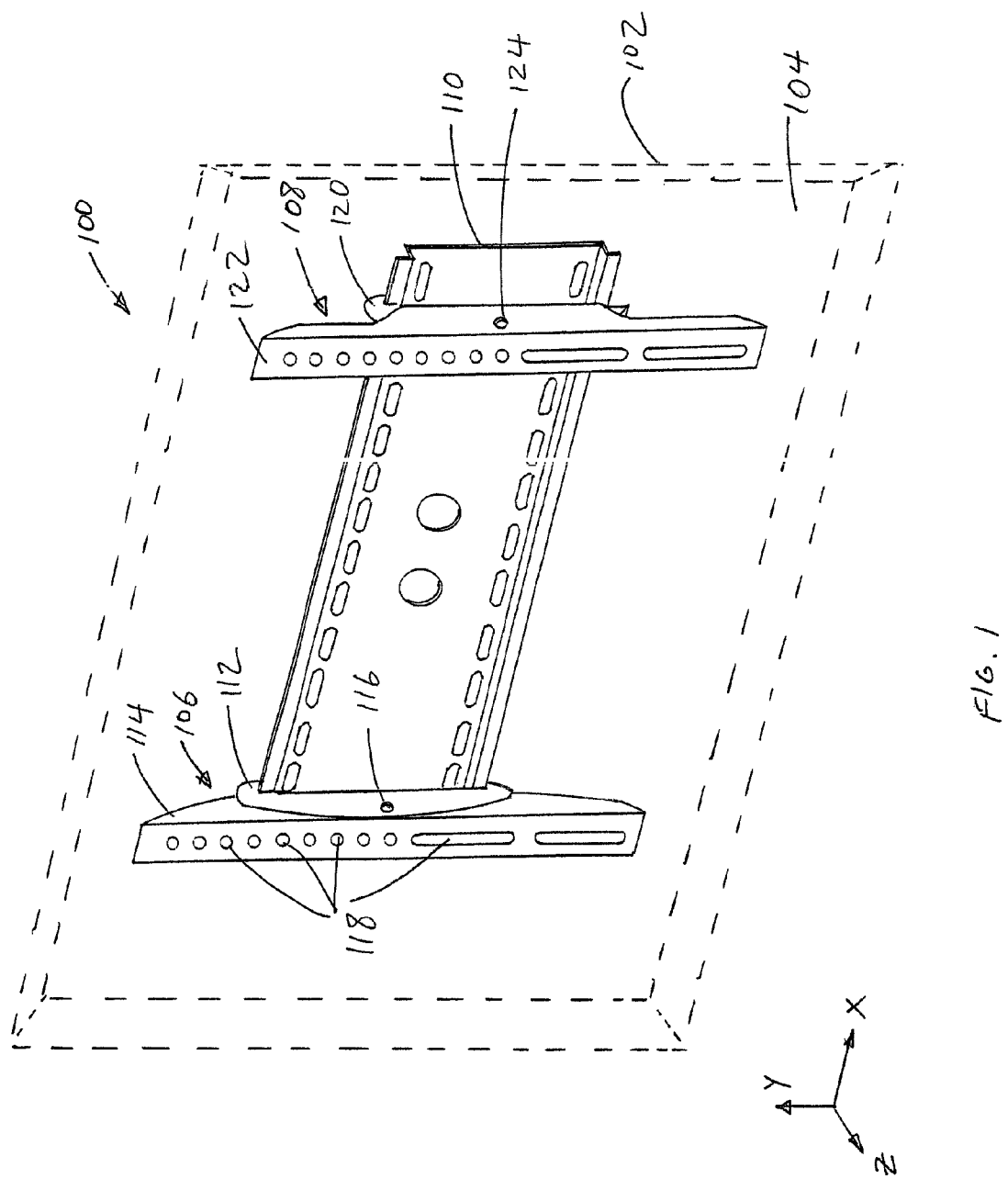
FIG. 1 shows perspective view of a mount system adapted to couple a rear side of a monitor in reference to X, Y, and Z coordinates.

FIG. 1 shows perspective view of a mount system 100 adapted to couple a rear side 102 of a monitor 104 in reference to X, Y, and Z coordinates. The mount system 100 may include a first mount bracket 106 and a second mount bracket 108. The first and second mount brackets 106 and 108 may be adapted to couple to an attachment bracket 110. The first mount bracket 106 may have a first housing bracket 112 and a first monitor mounting bracket 114. The first monitor mounting bracket 114 may be pivotably coupled to the first housing bracket 112 about a first pivot axis 116. When the mounting system 100 is in use, the first pivot axis 116 may be substantially along a horizontal axis. The first monitor mounting bracket 114 may be adapted to couple to the rear side 102 of the monitor 104. The first monitor mounting bracket 114 may have a plurality of holes 118 along its longitudinal axis so that one or more bolts may be used to insert through the desired holes to anchor with the threaded openings provided on the rear side 102 of the monitor 104. The first housing bracket 112 may be adapted to couple to the attachment bracket 110. A motorized actuator (not shown) may be provided between the first monitor mounting bracket 114 and the first housing bracket 112 to pivot the first monitor mounting bracket 114 about the first pivot axis 116.

The second mount bracket 108 may or may not be provided with a motorized actuator. The second mount bracket 108 may include a second housing bracket 120 and a second monitor mounting bracket 122. The second monitor mounting bracket 122 may be pivotably coupled to the second housing bracket 120 about a second pivot axis 124. The second monitor mounting bracket 122 may be adapted to couple to the rear side 102 of the monitor 104 and the second housing bracket 120 may adapted to couple to the attachment bracket 110. When the first and second mount brackets 106 and 108 are in use, the first pivot axis 116 and the second pivot axis 124 may be substantially aligned with each other along a horizontal axis, and the first mount bracket 106 may be spaced apart from the second mount bracket 108 along the longitudinal axis of the attachment bracket 110.

Depending on the weight and size of the monitor 104, the second mount bracket 604 may or may not be provided with a motorized actuator. In an application where the weight of the monitor 104 is less than a predetermined weight, then one of the first and second mount brackets 106 and 108 may be provided with a motorized actuator, and the other mount bracket may be a non-motorized mount bracket. In an application where the weight of the monitor 104 is equal to or above the predetermined weight, the both of the first and second mount brackets 106 and 108 may be provided with a motorized actuator.

Figure 2:
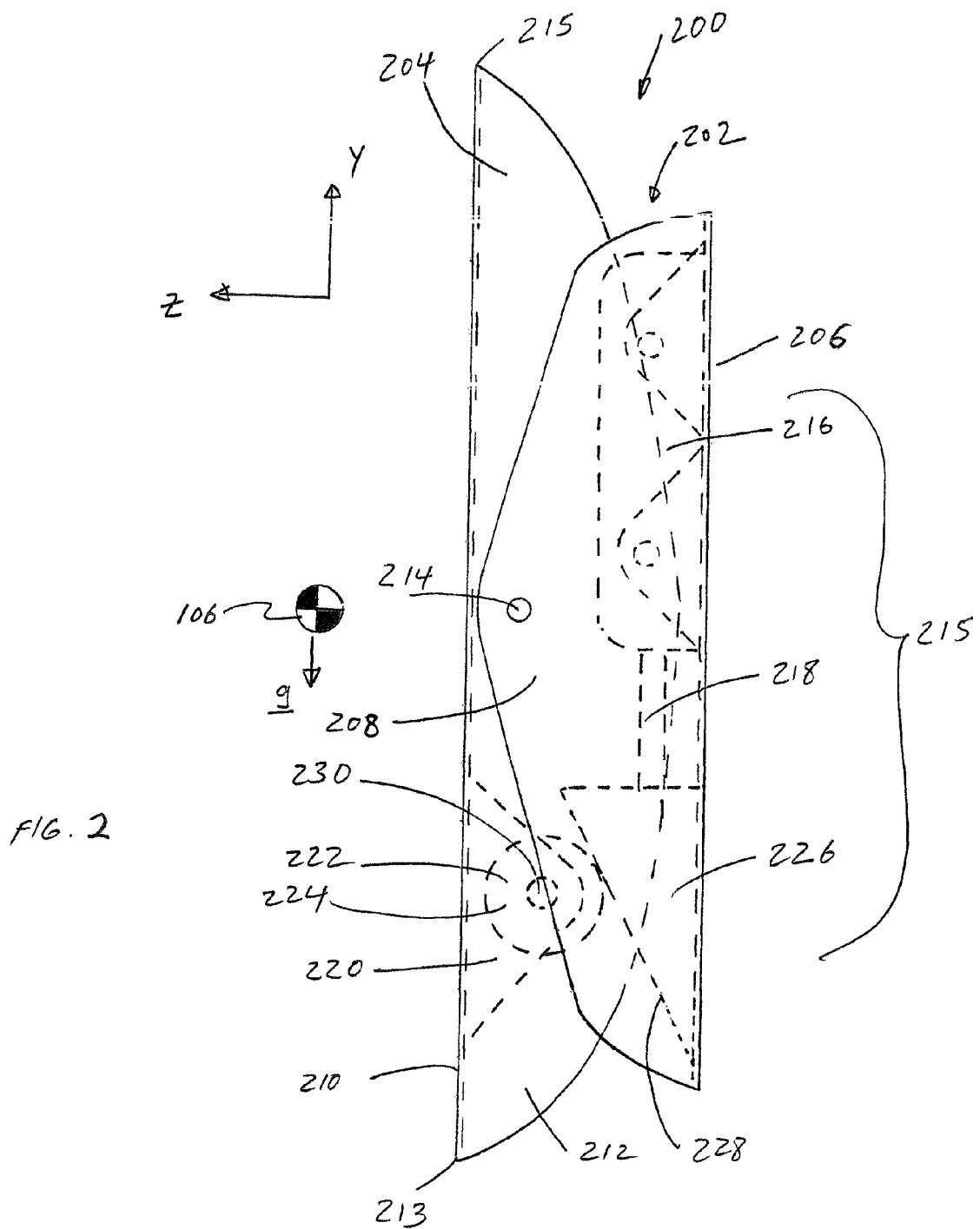
FIG. 2 shows a mount bracket with a motorized actuator in a retracted position.

FIG. 2 shows a mount bracket 200 with a motorized actuator that may be representative of the first mount bracket 106 discussed above. The mount bracket 200 includes a housing bracket 202 and a monitor mounting bracket 204. The housing bracket may have a base 206 and two side walls 208 (one side wall shown). The base 206 may be adapted to couple directly to a wall or the base 206 may be adapted to couple to the attachment bracket 110 that is adapted to couple to the wall.

The monitor mounting bracket 204 may have a base 210 and side walls 212 (one side wall shown). The monitor mounting bracket 204 has a first end 213 and a second end 215 defining a longitudinal axis therebetween. The monitor mounting bracket 204 may be pivotably coupled to the housing bracket 202 along a first pivot axis 214. The first pivot axis may be located between the first and second ends. The side walls 208 and 212 may be configured so that the side walls 208 and 212 substantially overlap each other as the monitor mounting bracket 204 rotates about the pivot axis 214 as shown in FIG. 3.

The mount bracket 200 includes an actuator system 215 to pivot the monitor mounting bracket about the first pivot axis 214. The actuator system 215 may include a motor 216 that extends and retracts a shaft 218 and a moving block 226. The motor 216 may be coupled to the base 206 of the housing bracket 202. The shaft 218 may be provided between the motor 216 and the moving block 226 that engages with a sliding member 222. The sliding member 222 may be provided on the monitor mounting bracket 204. The base 210 may have a protrusion member 220 to hold the sliding member 222 on its distal end. In this example, the sliding member 222 may be a wheel 224 adapted to rotate about a second pivot axis 230. The sliding member 222 may be also provided between the two side walls 212. The second pivot axis 230 may be located between the first pivot axis 214 and the first end 213. When the mount bracket 200 is in use, the first end 213 may represent the bottom end of the monitor mounting bracket 204.

In this example, the moving block 226 may be in the form of a triangular configuration where the slopping side 228 releasably engages with the wheel 224. As the moving block moves along the negative (−) Y-axis direction, the slopping side 228 pushes the wheel 224 substantially along the positive (+) Z-axis, thereby rotating the monitor mounting bracket 204 in a clockwise direction about the first pivot axis 214. In this example, the weight of the monitor 104 may be represented by its center of gravity 106 applying its gravitational weight substantially along the negative (−) Y-axis. As such, the weight of the monitor applies counter-clockwise directional force on the wheel 224 so that the wheel 224 substantially maintains its contact with the moving block 226.

Figure 3:
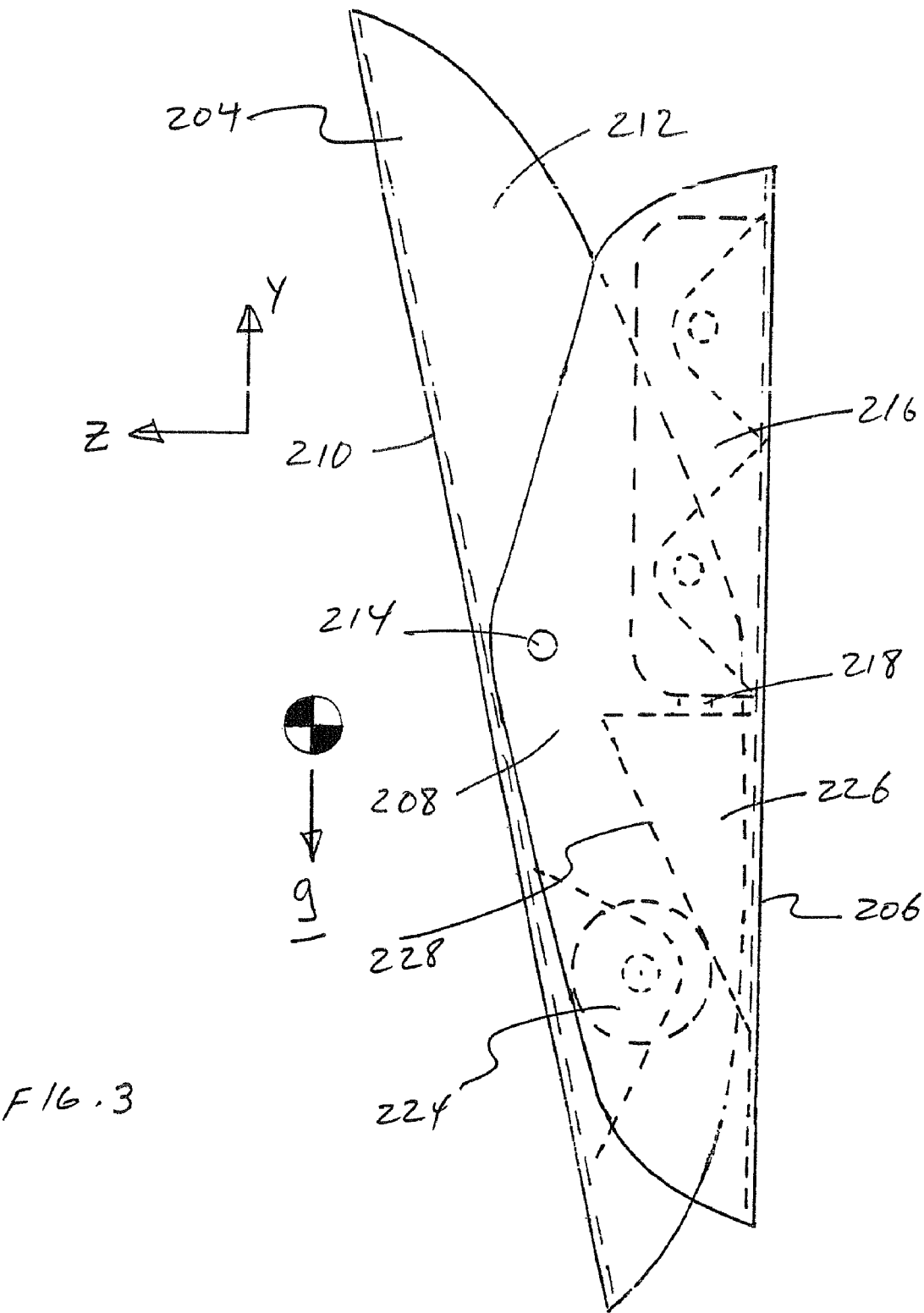
FIG. 3 shows the mount bracket of FIG. 2 in an extended position.

FIG. 3 shows the shaft 218 of the actuator system 215 in a retracted position. As the motor 216 retracts the shaft 218, the wheel 224 rolls along the slopping side 228 to move closer to the base 206 such that the monitor mounting bracket 204 rotates in a counter-clockwise direction along the YZ plane to tilt the monitor down. In this example, sliding the moving block in the positive (+) Y-axis direction causes the weight of the monitor to rotate the monitor mounting bracket 204 and the monitor 104 about the first pivot axis 214 in a counter-clockwise direction.

Figure 4:
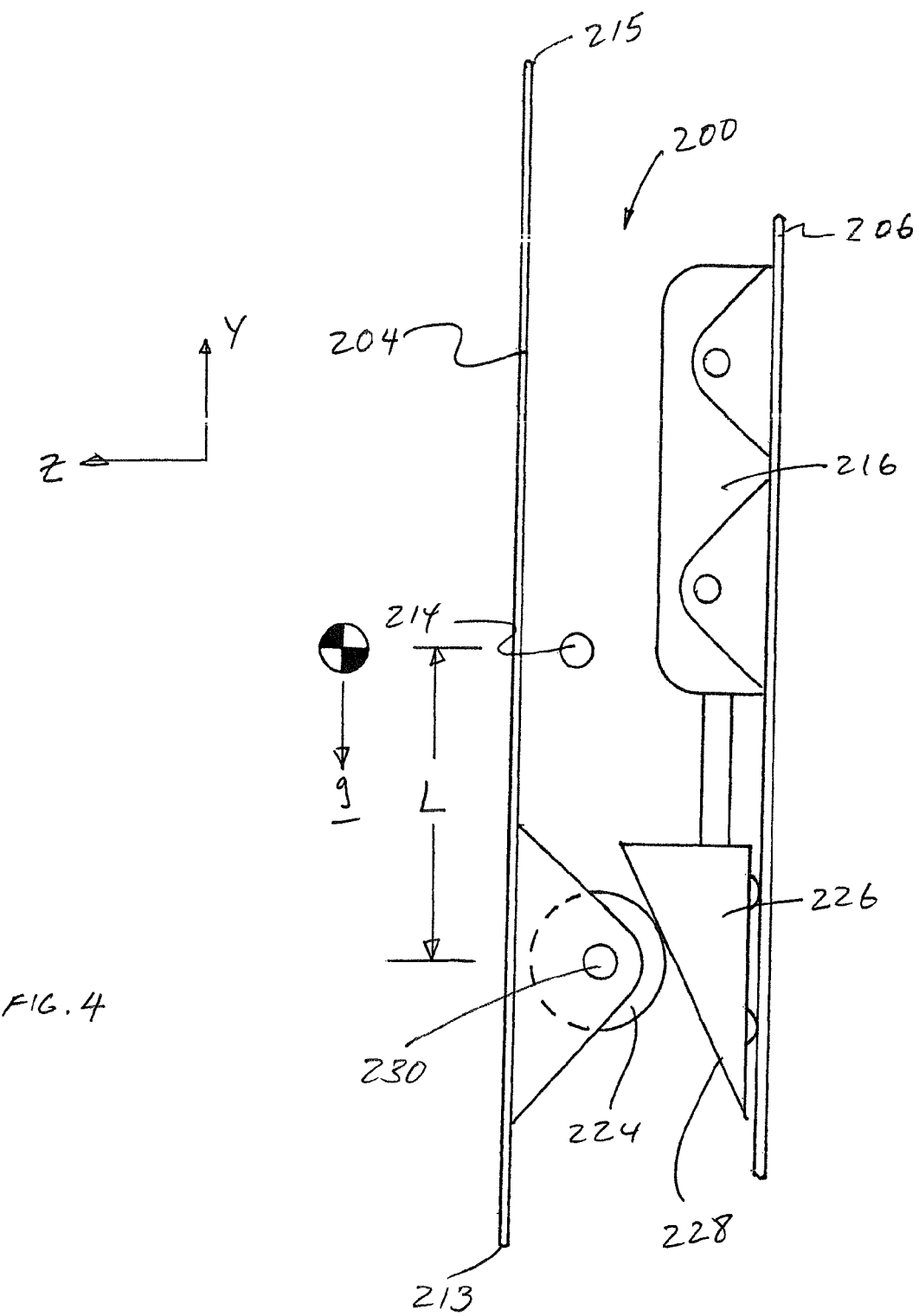
FIG. 4 shows a schematic diagram of the mount bracket of FIG. 2 in a retracted or upright position.
Figure 5:
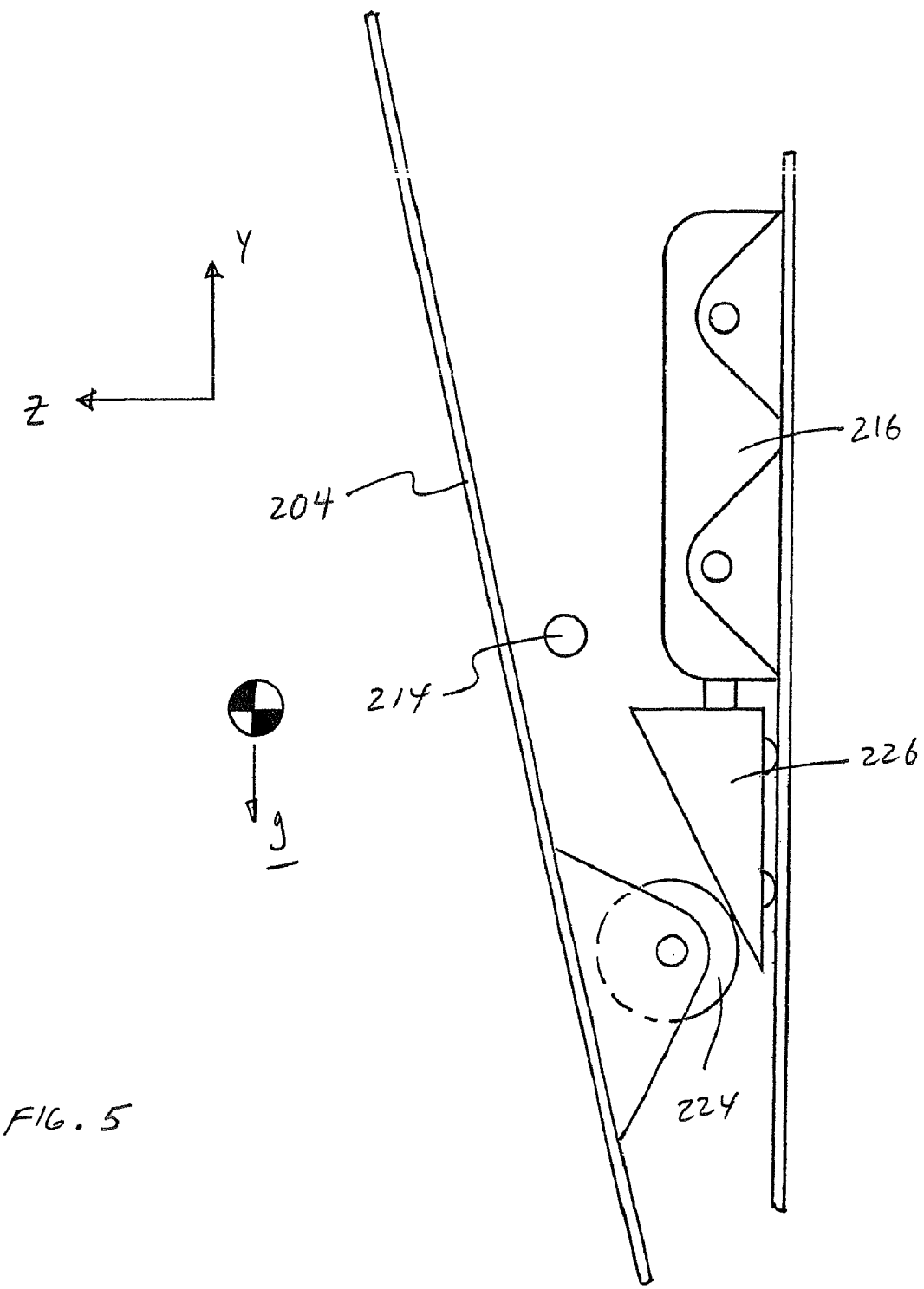
FIG. 5 shows a schematic diagram of the mount bracket of FIG. 2 in an extended or down position.
Figure 6:
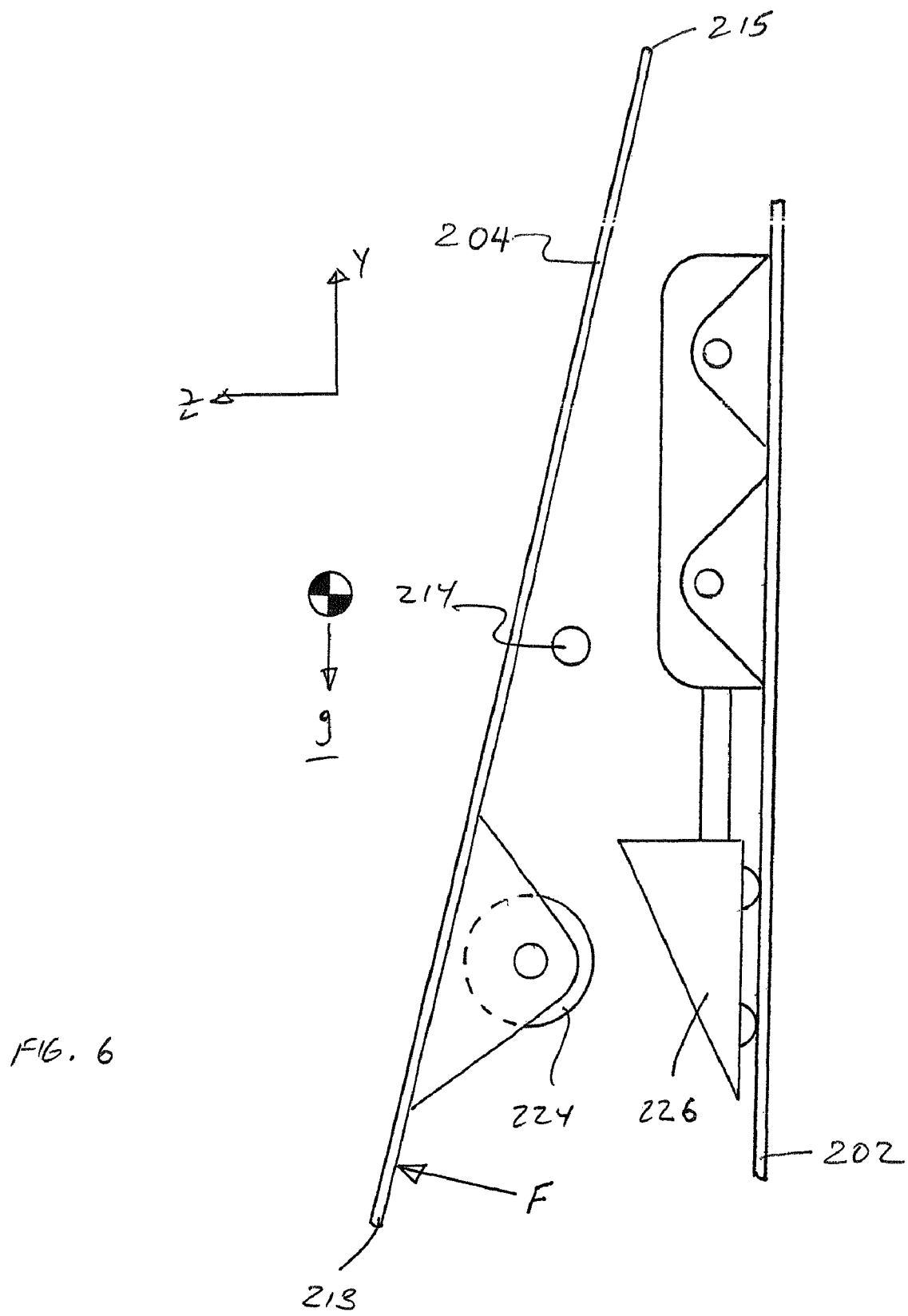
FIG. 6 shows a schematic diagram of the mount bracket of FIG. 2 in a tilt up position.

FIGS. 4, 5, and 6 show schematic diagram of the mount bracket 200 in different positions. FIG. 4 shows the mount bracket 200 substantially along the Y-axis or in an upright position. Note that sliding the moving block 226 in the negative (−) Y direction causes the monitor mounting bracket 204 to rotate in a clockwise direction about the pivot axis 214. To counter act the weight of the monitor 104, the moving block 226 acts as a ramp or a wedge to push against the wheel 224 to minimize the torque required from the motor 216. Moreover, the distance "L" between the first pivot axis 214 and the second pivot axis 230 provides leverage to pivot the monitor 104. Note as the distance L increases, more leverage is provided to tilt the monitor.

FIG. 5 shows that sliding the moving block 226 in the positive (+) Y-axis causes the monitor mounting bracket 204 to rotate in a counter-clockwise direction about the pivot axis 214 to tilt the monitor downwards. FIG. 6 shows that the wheel 224 may be releasable engaged with the moving block 226 so that applying a force F to counteract the weight of the monitor rotates the monitor mounting bracket 204 in a counter-clockwise direction about the pivot axis 214. As such, if a foreign object gets in between the monitor mounting bracket 204 and the housing bracket 202 near the first end 213, the bottom end when the mount bracket 200 is being used, as the monitor mounting bracket 204 is moving in a counter-clockwise direction, the wheel 224 disengages with the moving block 226 and the moving block 226 continues to move in the positive (+) direction. As such, the force applied to the foreign object is from the weight of the monitor but the motor 216 does not apply additional force on the foreign object.

Figure 7:
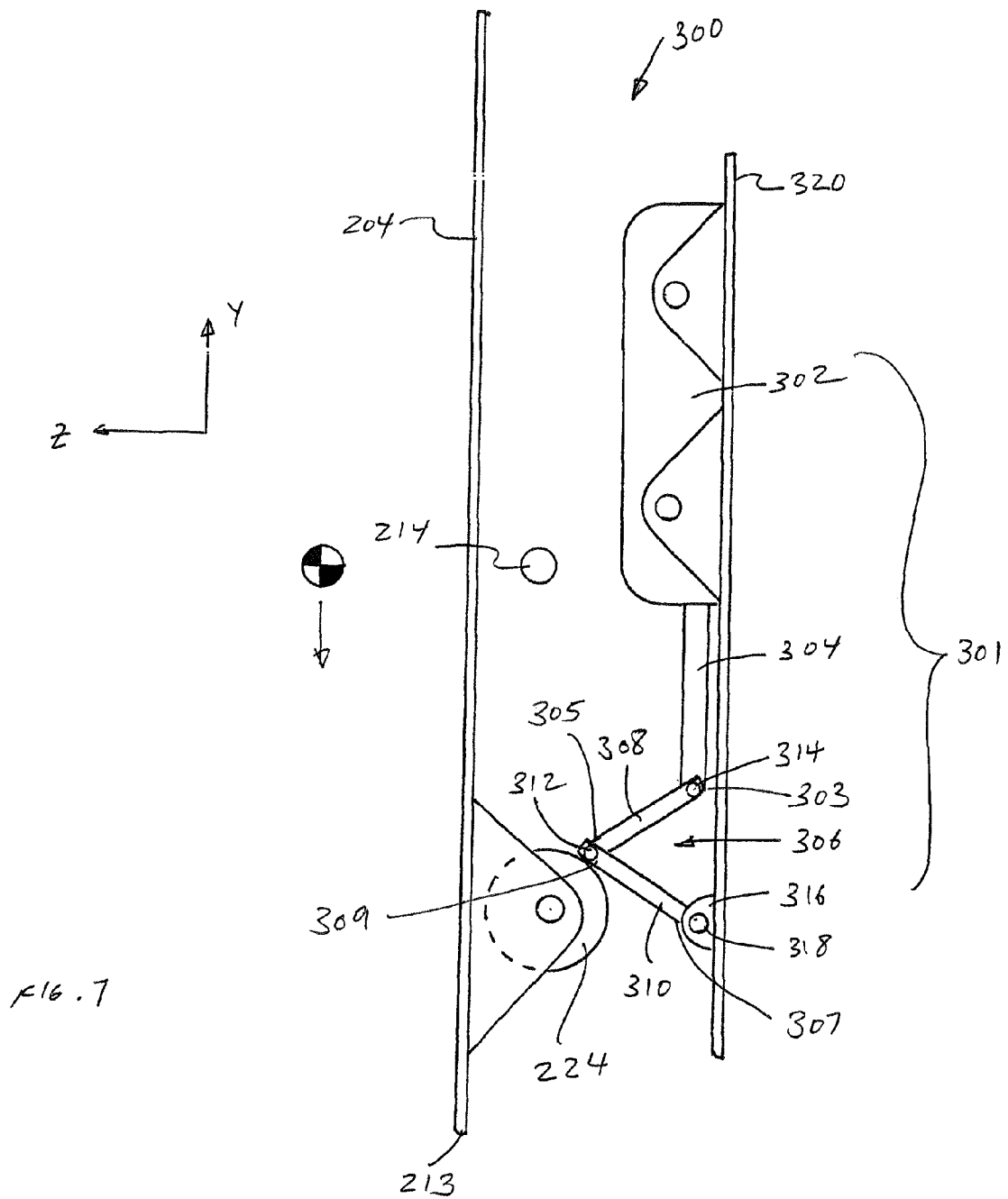
FIG. 7 shows a mount system including a link system to pivot a monitor.

FIG. 7 shows a mount system 300 including an actuator 301 to pivot the monitor mounting bracket 204 about the first pivot axis 214. The actuator 301 may include a motor 302, a shaft 304, and a link system 306. The link system 306 may include a first link 308 and a second link 310. The first link 308 has a proximal end 303 and a distal end 305. The second link 310 has a proximal end 307 and a distal end 309. The distal ends 305 and 309 may be pivotably coupled to each other about a first pivot axis 312, and adapted to releasably engage with the first monitor mounting bracket 204 to push and pivot the first monitor mounting bracket 204 about the first pivot axis 214. The proximal end 303 may be pivotably coupled to the shaft 304 about a second pivot axis 314, and the proximal end 307 may be pivotably coupled to a support mount 316 about a third pivot axis 318. As the proximal ends 303 and 307 of the first and second links move closer together, the distal ends 305 and 309 of the first and second links extend to push on the wheel 224 so that the first monitor mounting bracket 204 moves further away from the base 320 of first housing bracket. As the proximal ends 303 and 307 of the first and second links move away from each other, the distal ends 305 and 309 of the first and second links retract so that the first monitor mounting bracket 204 can move closer to the base 320 first housing bracket.

Figure 8:
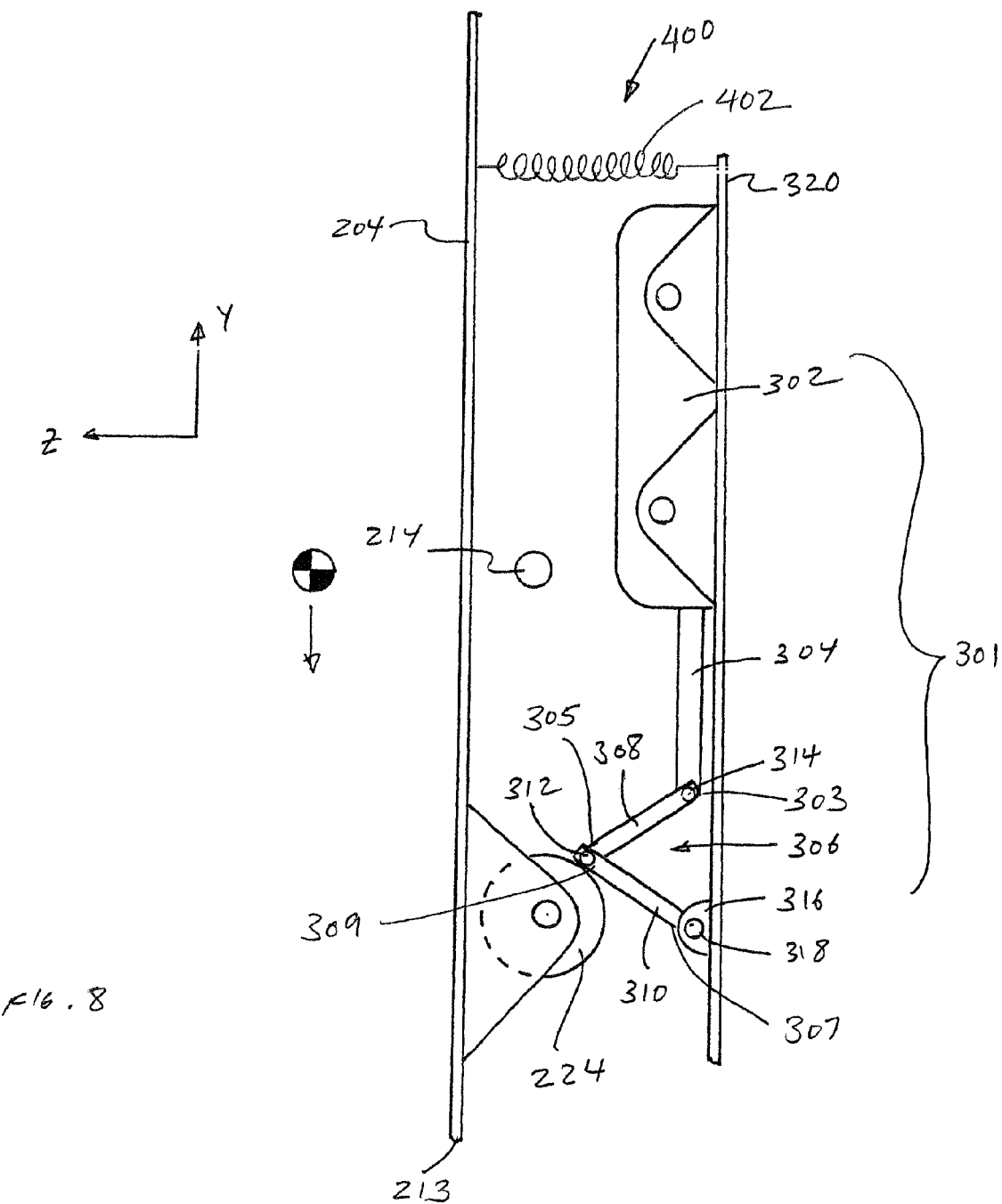
FIG. 8 shows a mount system of FIG. 7 with a spring to counteract the weight of the monitor.

FIG. 8 shows a mount system 400 that is similar to the mount system 300 discussed above, but with a spring 402. The spring 402 may counteract the weight of the monitor 102 so less torque is required from the motor 302.

Figure 9:
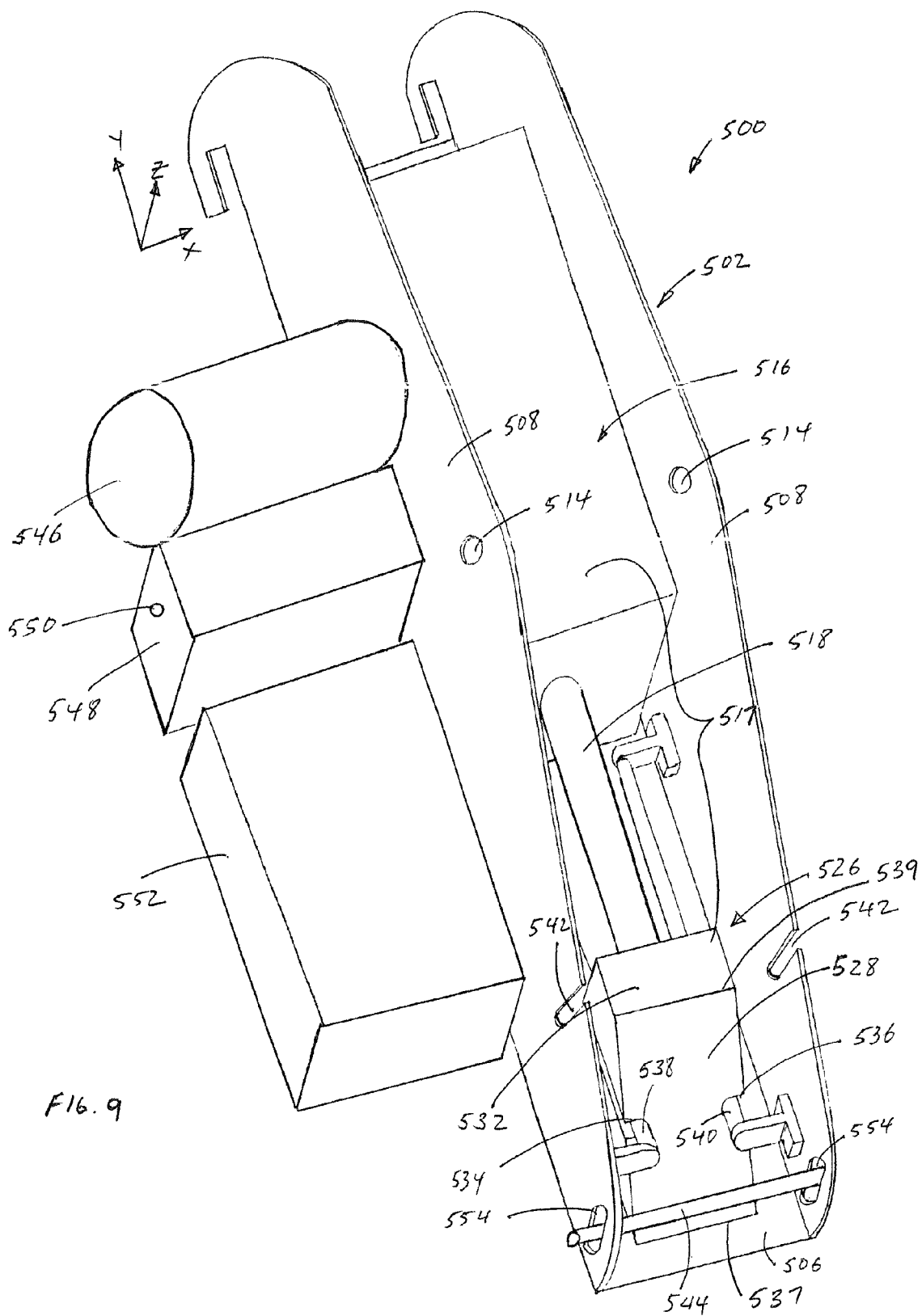
FIG. 9 shows a perspective view of a mount system in reference to X, Y, and Z coordinates showing an actuator system.

FIG. 9 shows a perspective view of a mount system 500 in reference to X, Y, and Z coordinates, which is similar to the mount bracket 200 described above. The mount system 500 includes a housing bracket 502 having a base 506 and side walls 508. Each of the two side walls 508 may have an open slot 542 as discussed in more detail below. In addition, each of the side walls 508 may have a hole 514 substantially aligned with respect to each other along the X-axis. The two holes 514 may be used to pivotably couple the housing bracket 502 to the monitor mounting bracket, as discussed below. The base 506 may be adapted to couple directly to a supporting surface such as a wall, or the base 506 may be adapted to couple to the attachment bracket or wall bracket 110 that is adapted to couple to the wall.

The mount system 500 includes an actuator 517 that extends and retracts its shaft 518 and moving block 526. In this example, the moving block 526 may have a first surface 528 that engages with a wheel, as described in more detail below. The first surface 528 may be sloped relative to the XY plane. The moving block 526 may also include a second surface 532 that is substantially parallel with the XY plane or the base 506. The moving block 526 may also have a first cavity 534 and a second cavity 536 extending substantially along the longitudinal axis of the shaft 518. The first and second cavities 534 and 536 may be adapted to engage with a first guiding member 538 and a second guiding member 540, respectively, so that the moving block 526 is guided to move substantially along the longitudinal axis of the shaft 518. The moving block 526 may have a low end 537 and a high end 539. The mount system 500 may also include a stopper 544 adapted to engage with a monitor mounting bracket as discussed in more detail below.

The actuator 517 may include a motor 546 where activation of the motor 546 causes the shaft 518 to extend and retract. A gear mechanism 516 may be provided between the motor 546 and the shaft 518 to transfer the rotational torque from the motor 546 to linear extension and retraction motion of the shaft 518. The mount system 500 may include a control circuit 548 to control the actuator 517. The control circuit 548 may have an input jack 550 to receive one or more control signals to adjust the viewing angle of the monitor. The control signal may be received from a wireless receiver. Alternatively, the control circuit 548 may be adapted to detect whether the monitor is on or off, and retract the monitor so that it is substantially upright when the monitor is turned off, and tilt the monitor down when the monitor is turned on. The mount system 500 may be also provided with a monitor and communicably linked to the monitor to determine whether the monitor is on or off. The mount system 500 may include a power supply 552 to power the control circuit 548 and the actuator 517.

Figure 10:
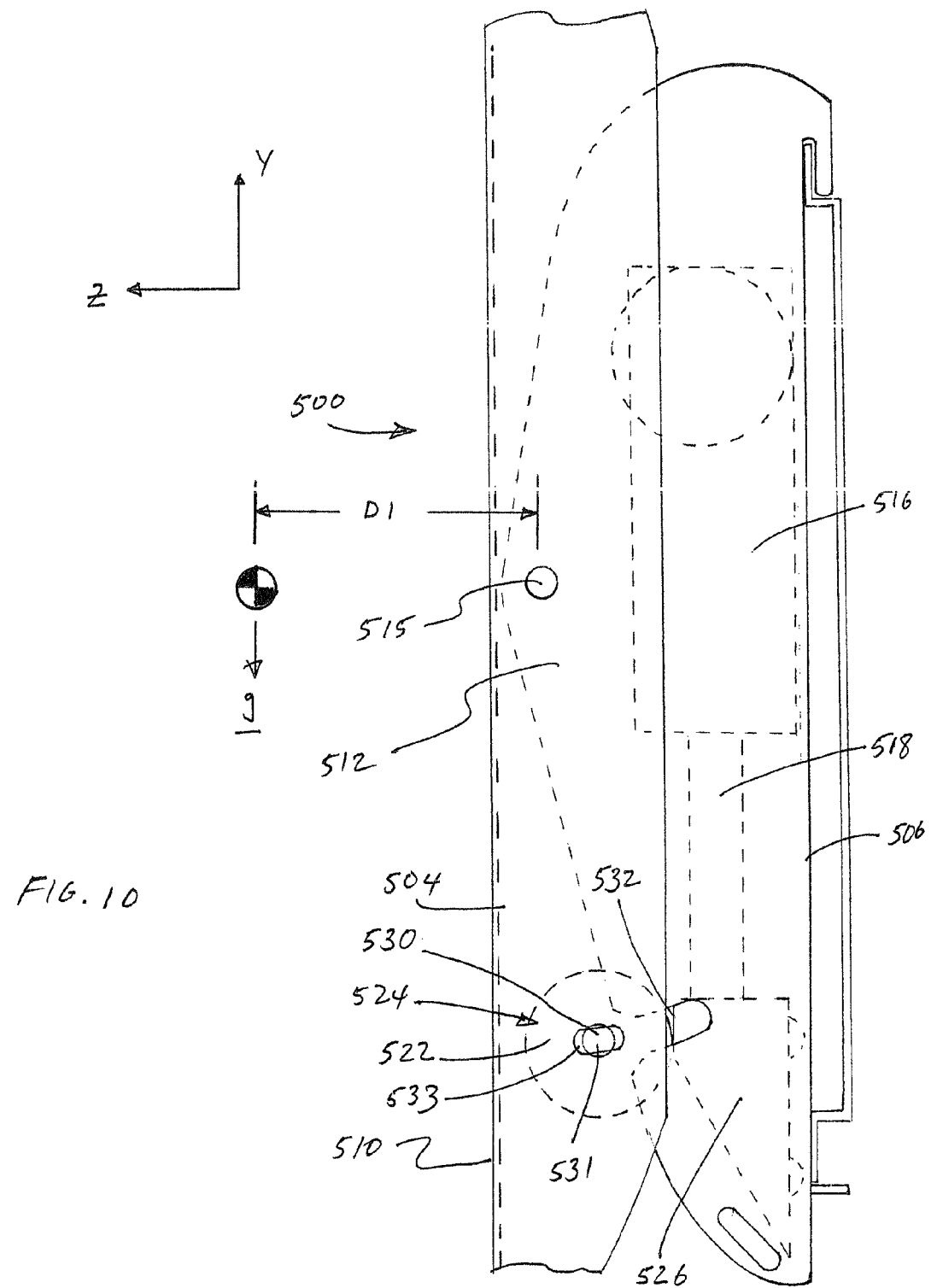
FIG. 10 shows a side view of the mount system of FIG. 9.

FIG. 10 shows the mount system 500 in a retracted position in reference to the YZ plane. The mount system 500 includes a monitor mounting bracket 504 adapted to pivotably couple to the housing bracket 502. The monitor mounting bracket 504 has a base 510 and side walls 512. The monitor mounting bracket 504 may be pivotably coupled to the housing bracket 502 along a first pivot axis 515, which is substantially aligned with the hole 514 formed on the side walls 508 of the housing bracket 502. The side walls 508 and 512 may be configured so that the side walls 508 and 512 substantially overlap each other as the monitor mounting bracket 504 rotates about the pivot axis 55, as shown in FIG. 11.

A sliding member 522 may be coupled to the side walls 512. In this example the sliding member 524 may be a wheel adapted to rotate about its axel 531. The location of the axel 531 may define a second pivot axis 530. The axel 531 may be releasably engaged with an elongated opening 533 formed within the side walls 512. The location of the axel 531 may be adjusted along the elongated opening 533 and secured. In the retracted position, if the wall is not vertical then the monitor 104 may not be in an upright position, even if the base 510 is parallel relative to the base 506 of the housing bracket. Under such circumstances, the pitch of the base 510 may be adjusted to a desired position by adjusting the location of the axel 531 along the elongated opening 533.

When the monitor mounting bracket 502 is in the retracted position or when the shaft is in an extended position, the wheel 524 may rest on the second surface 532 of the moving block 526. The surface area of the second surface 532 along the Y-axis may be sufficiently long enough so that even if the actuator 517 over extend the shaft 518, the moving block 526 does not further extend the wheel 524. In the retracted position, the pitch or the tilt of the base 510 may be adjusted by moving the location of the axel 531 along the elongated opening 533. For instance, by un-tightening the screw or bolt holding the axel 531 in place, the location of the axel 531 may be relocated in the positive (+) Z-axis within the elongated opening 533, and the axel 531 may be secured in the new position. This allows the base 510 or the monitor 104 to tilt down further and vice versa. This way, if the monitor is not in a desired upright position in the retracted position, the pitch or tilt position of the monitor may be adjusted, as described above.

Figure 11:
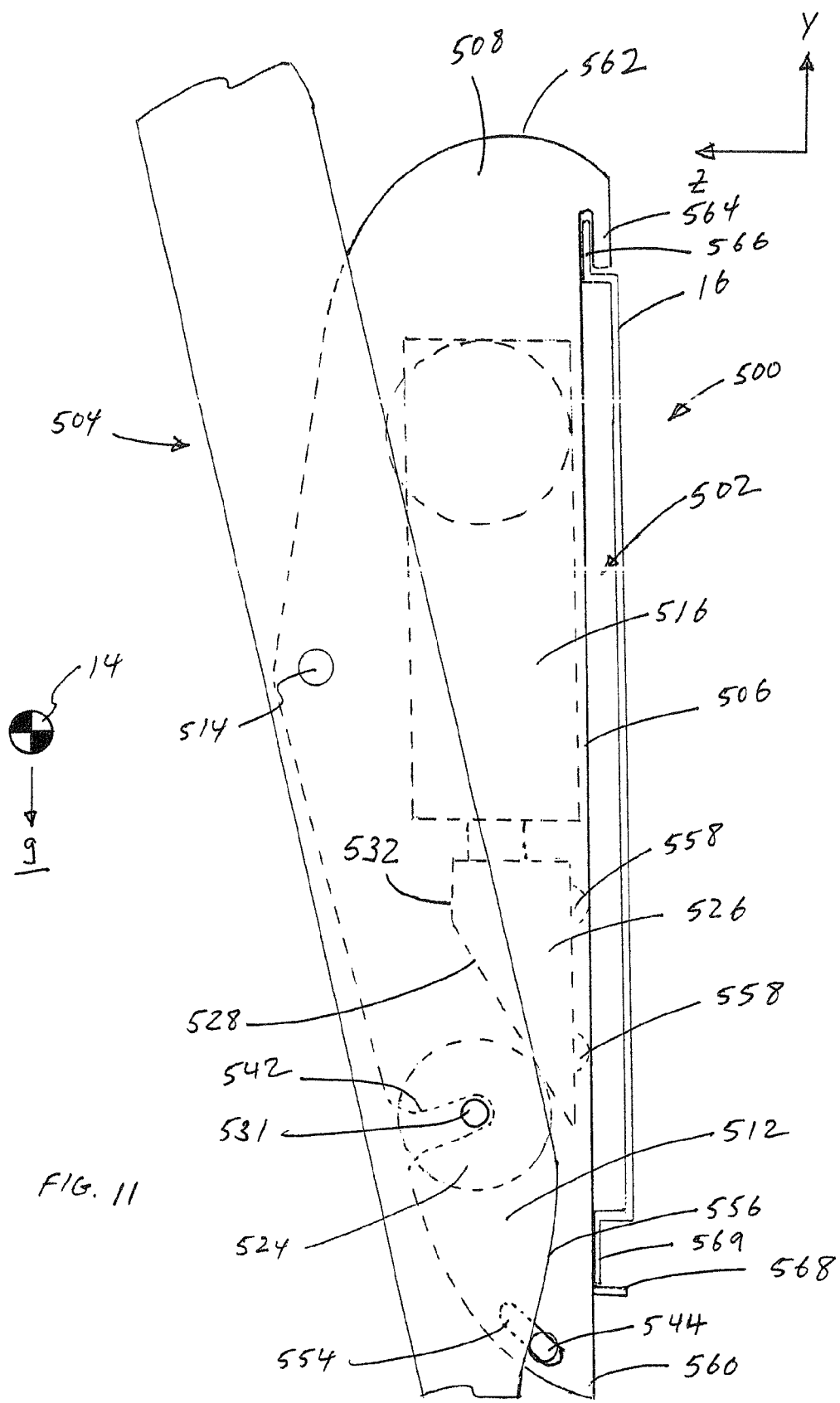
FIG. 11 shows the mount system of FIG. 10 in an extended or tilt down position.

FIG. 11 shows the mount system 500 in an extended or tilt down position. From the retracted position as shown in FIG. 10, as the moving block 526 moves along the positive (+) Y-axis, the wheel 524 rolls down the first surface 528 as weight of the monitor pushes down on the wheel 224. This rotates the monitor mounting bracket 504 in a counter-clockwise direction about the first pivot axis 514. Note that with the weight of the monitor 104 represented by its center of gravity 106 applying its gravitational weight substantially along the negative (−) Y-axis, the weight of the monitor applies pressure on the wheel 224 to substantially remain in contact with the moving block 526. The distance "D1" between the center of gravity 106 of the monitor and the first pivot axis 515 may determine the amount of force or weight applied to the moving block 526. In general, as the distance D1 increases, the force applied to the moving block 526 by the wheel 224 may increase as well, and vice versa.

FIG. 11 shows that as the mount system 500 extends, as described above, the axel 531 insert into the open slot 542 on the side walls 508. The side walls 508 may have a second set of elongate openings 554 adapted to engage with the stopper 544. Depending on the location of the stopper 544 along the second set of elongated openings 554, the stopper 544 may stop the monitor mounting bracket 504 at a predetermined extended position. For instance, as the actuator 517 moves the moving block 526 in the positive (+) Y-axis, the monitor mounting bracket 504 extends or tilts down until the edge 556 of the side wall 512 makes contact with the stopper 544 and stops extending or tilting down. As the actuator 517 continues to move the moving block 526 in the positive (+) Y-axis, the first surface 528 of the moving block 526 disengages with the wheel 524. As such, the stopper 544 may be used to ensure that the bottom edge of the monitor does not contact the wall.

Next time the actuator 517 moves the moving block 526 in the negative (−) Y-axis, the first surface 528 reengages with the wheel 524 to retract or tilt up the monitor mounting bracket 504 until the wheel 524 rolls onto the second surface 532 of the moving block 526. Again, with the second surface 532 having a certain amount of runway along the Y-axis, even if the actuator 517 over extends the moving block 526 in the negative (−) Y-axis, the monitor mounting bracket 504 may maintain its predetermined retracted position or upright position. In addition, the stopper 544 may also prevent the moving block 526 from over extending from the housing bracket 502.

The moving block 526 may have one or more rollers 558 to smoothly move the moving block over the base 506 of the housing bracket 502. The housing bracket 502 may have a first end 560 and a second end 562. The second end 562 may be adapted to couple to the attachment bracket 110. For instance, the second end may have a hook 564 to latch over a first tip 566 of the attachment bracket 110. The first end 562 may have a lip 568 that is adapted to engage with a second tip 569 of the attachment bracket 110. When the mount system 500 is in use, the first end 560 may be the bottom end.

Figure 12:
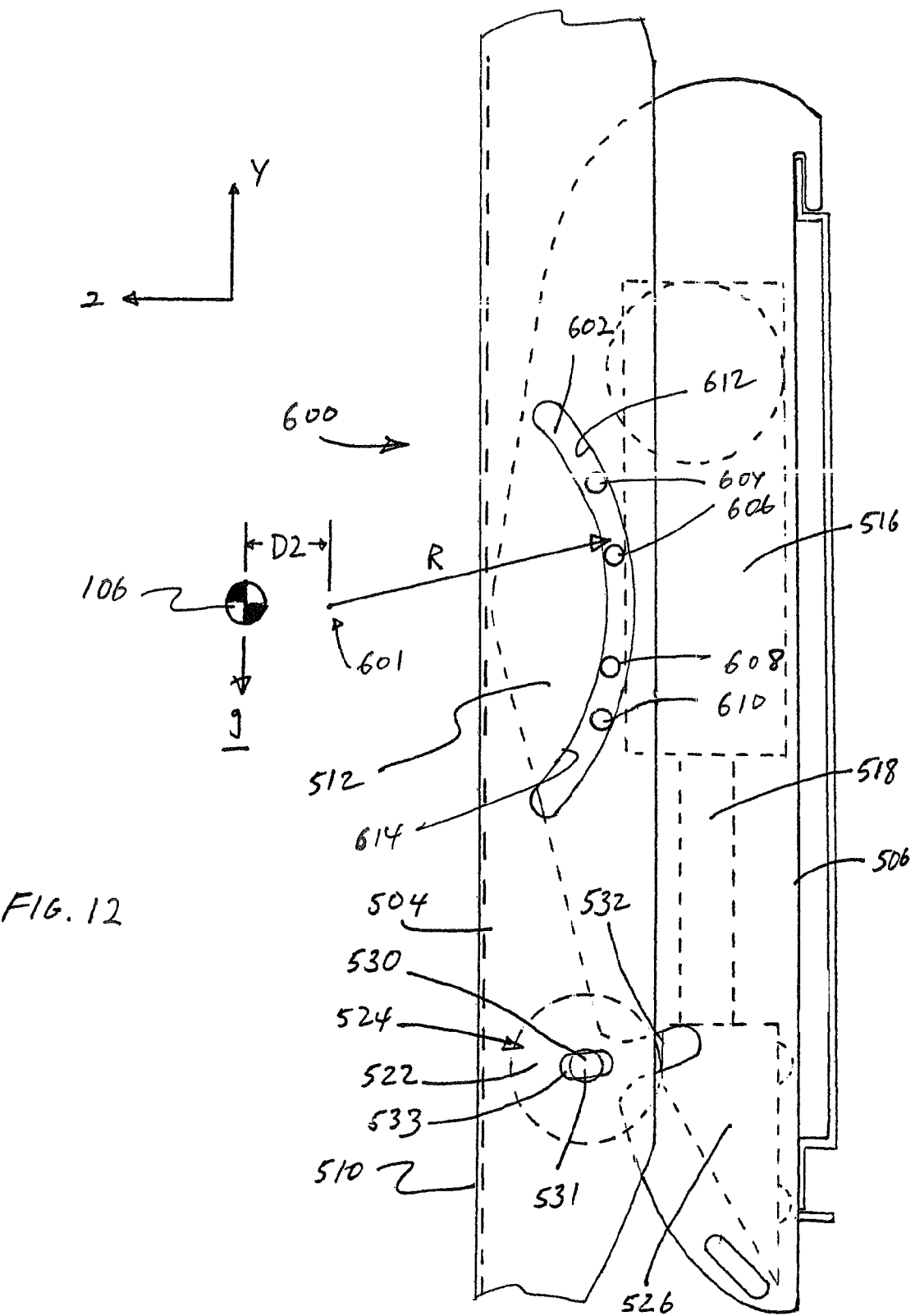
FIG. 12 shows a mount system similar to the mount system of FIG. 9 with an alternative mechanism to pivot a monitor.

FIG. 12 shows a mount system 600 similar to the mount system 500 with an alternative mechanism to pivotably couple the monitor mounting bracket 504 to the housing bracket 502. Referring to FIG. 10, the distance "D1" between the center of gravity 106 of the monitor and the first pivot axis 515 may determine the amount of force or weight applied to the moving block 526. In general, as the distance D1 increases, the force applied to the moving block 526 by the wheel 524 may increase as well, and vice versa. To minimize the force applied to the moving block 526, the distance "D2" between the center of gravity 106 of the monitor 104 and the pivot axis 601 in which the monitor 104 substantially pivots from may be less than the distance D1. The pivot axis may be moved from the location of the first pivot axis 515 to the pivot axis 601 by pivoting the monitor mounting bracket 504 in a circular manner substantially defined by a curvature opening 602.

FIG. 12 shows the curvature opening 602 formed on the sidewalls 512 of the monitor mounting bracket 504, however, the curvature opening 602 may be also formed on the sidewalls 508 of the housing bracket 502 or both. The curvature opening 602 may have a radius of curvature defined by a radius "R" with its focal point at the pivot axis 601. One or more sliding members 604, 606, 608, and 610 may be used to moveably couple the monitor mounting bracket 504 to the housing bracket 502. The sliding members may guide the monitor mounting bracket 504 along the curvature opening 602 to pivot the monitor 104 about the pivot axis 601. In one example, the sliding members may be rollers adapted to guide the monitor mounting bracket 502 to rotate along the curvature opening 602 and support the weigh of the monitor 104. The curvature opening 602 may have a first edge 612 and a second edge 614. A first set of rollers 604 and 610 may be coupled to the side wall 508 and engage with the first edge 612, and a second set of rollers 606 and 608 may be coupled to the side wall 508 and engage with the second edge 614. This allows the monitor mounting bracket 504 to slide along the rollers with minimal friction and support the weigh of the monitor.

Figure 13:
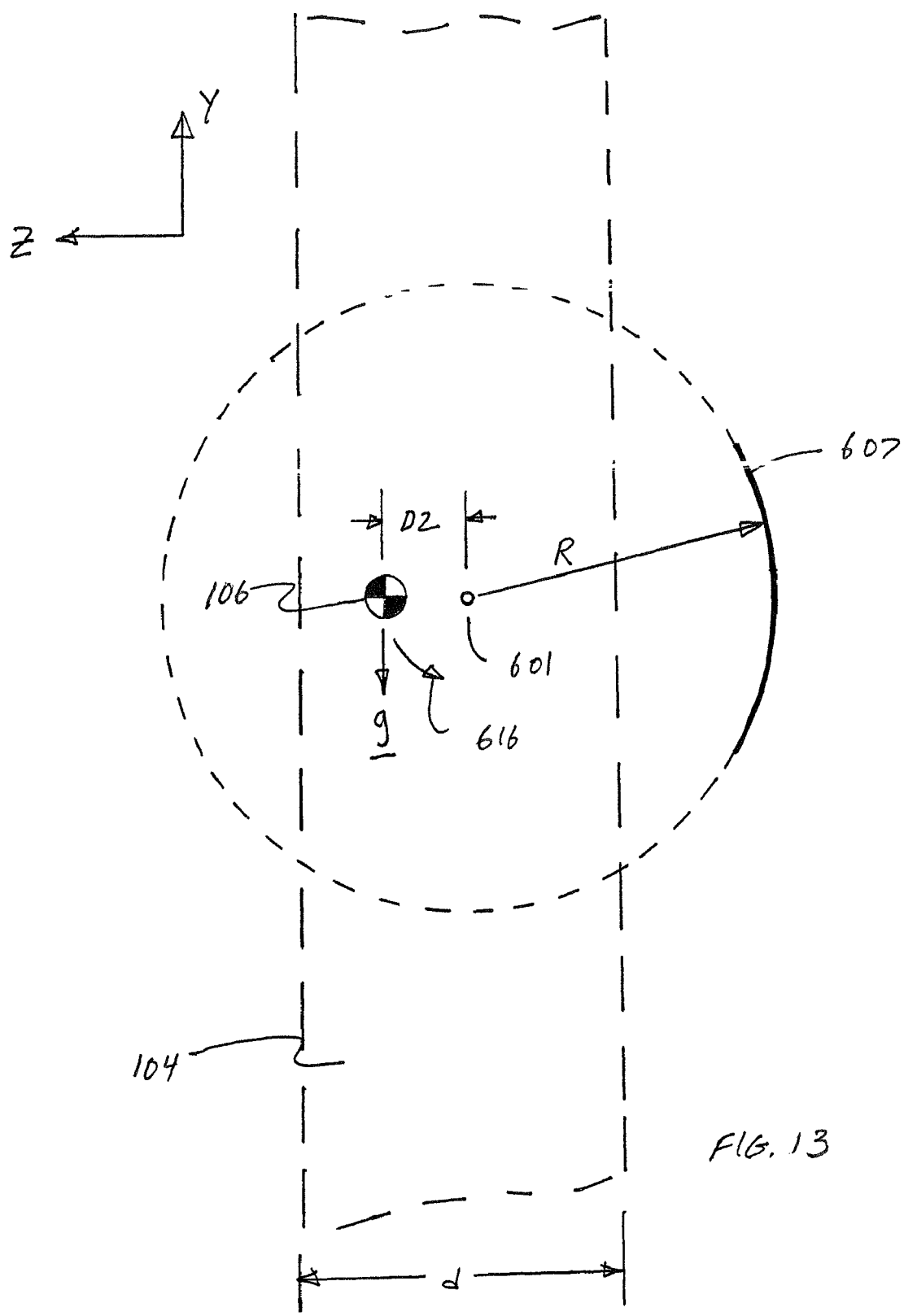
FIG. 13 shows a schematic representation of the curvature opening shown in FIG. 12.

FIG. 13 shows a schematic representation of the curvature opening 602 relative to the center of gravity 106 of the monitor 104. In general, the depth "d" of most monitors is from 3 inches to 4 inches. With the weight of the glass being in front of the monitor, which accounts for a major portion of the total weight of the monitor, the center of gravity 106 of the monitor 104 is generally closer to the front side of the monitor. With the curvature opening 602 having a radius of curvature defined by the radius R, the focal point or pivot axis 601 may be located within the space defined by the monitor. This minimizes the distance D2 between the pivot axis 601 and the location of the center of gravity 106. With the location of the center of gravity 106 in the positive (+) Z-axis in relation to the pivot axis 601, the monitor may have a natural tendency to pivot in the counter-clockwise direction as indicated by the direction arrow 616 so that the wheel 524 substantially remains in contact with the moving block 526. The force applied by the wheel 524 on the moving block 526, however, may be minimized due the shorter distance D2 relative to D1. Note that in applications where it is desirable to have a monitor pivot in the clockwise direction, the radius of curvature 602 may be elongated or increase R so that the center of gravity 106 is in the negative (−) Z direction relative to the pivot axis 601. In addition, depending on the size and depth of the monitor, the radius R and the distance D2 may change.

Figure 14:
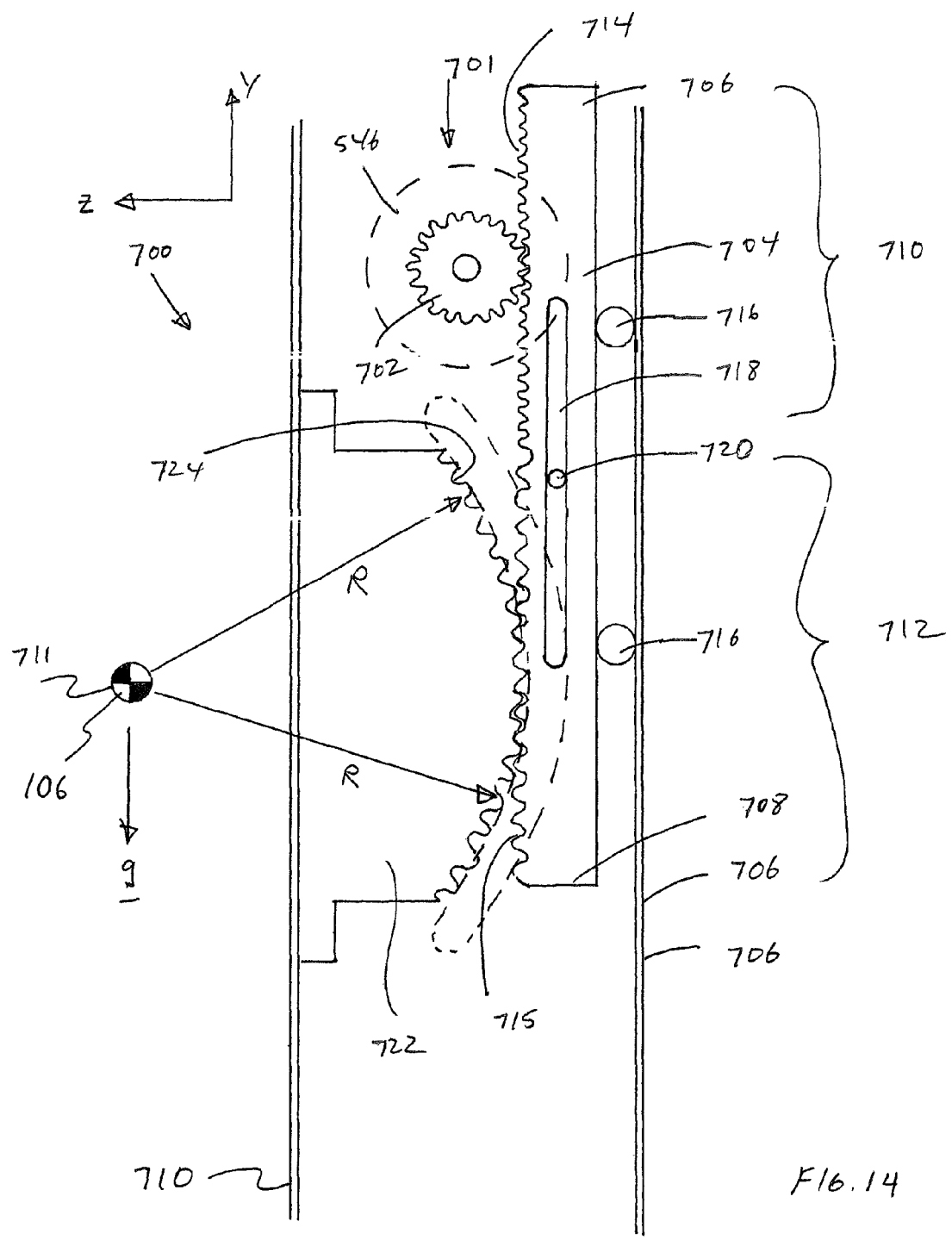
FIG. 14 shows a mount system in reference to YZ coordinates having an actuator system adapted to pivot a monitor.

FIG. 14 shows a mount system 700 in reference to YZ coordinates having an actuator system 701 adapted to pivot a monitor. The mount system 700 includes a housing bracket with a base 706 pivotably coupled to a monitor mounting bracket move having a base 710. The base 710 adapted to pivot about a pivot axis 711, which may be substantially aligned with the location 106, which is the center of gravity of the monitor. The actuator system 701 includes a motor 546 mechanically coupled to a gear 702 to rotate the gear 702. The actuator system 701 also includes a shaft 704 having a first end 706 and a second end 708. The shaft 704 may be divided into a first portion 710 and a second portion 712. The first portion 710 may have a first set of gear teeth 714 along the longitudinal axis of the shaft 704 on one side. The first portion 712 may have a second set of gear teeth 715 along the longitudinal axis of the shaft 704 on the same side of the shaft 704 as the first set of teeth 714. The gear 702 may be adapted to engage with the teeth 714 on the first portion 710 of the shaft 704 such that as the motor 546 rotates the gear 702, the shaft 704 may move along its longitudinal axis.

The shaft 704 may be supported by one or more rollers 716 so that the shaft 704 may move smoothly along its longitudinal axis. The shaft 704 may have an elongated opening 718 along the second portion of the shaft 704. A rod 720 may be incorporated into the elongated opening 718 to guide the shaft 704 so that the shaft 704 moves substantially parallel with the base 706.

The actuator system 701 may also include a second gear 722 coupled to the monitor mounting bracket or the base 710. The second gear 722 may have a third set of gear teeth 724 adapted to engage with the second set of gear teeth 715. The third set of gear teeth 724 may be arranged in a semi-circular manner defined by a radius of curvature R with the pivot axis 711 being in the focal point. The first set of gear teeth 714 may have different pitch than the second set of gear teeth 715. For instance, the first set of gear teeth 1014 may have smaller pitch than the second set of gear teeth 715. As the motor 546 rotates the gear 702 in a counter-clockwise direction, the shaft 704 moves in a positive (+) Y direction, thereby rotating the second gear 722 in a counter-clockwise direction to pivot the monitor down about the pivot axis 14, and vice versa. Note that sensors may be used to adjust the retracted and extended position of the monitor as discussed above in reference to FIGS. 36 and 37.

Figure 15:
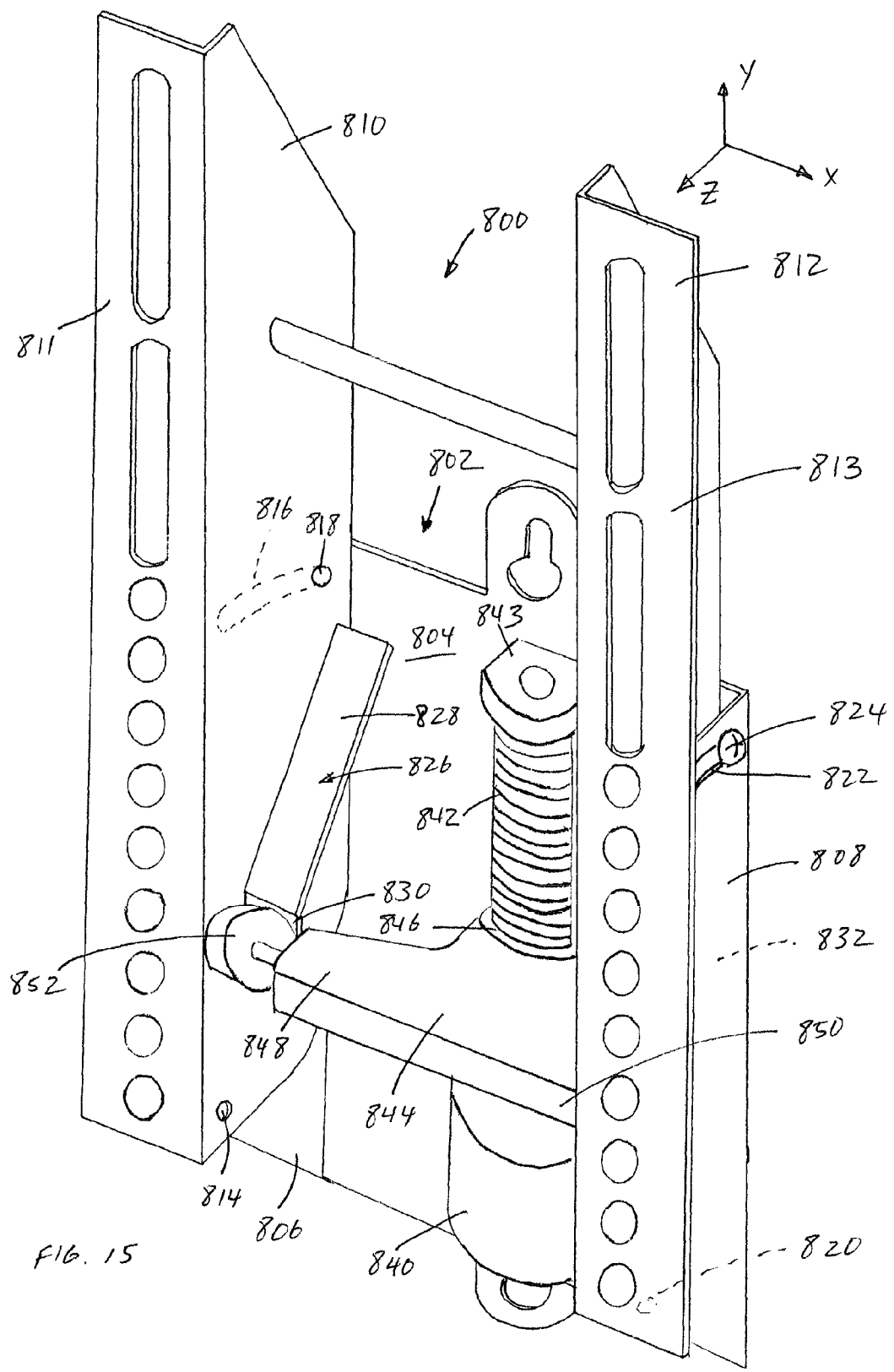
FIG. 15 shows a perspective view of a different embodiment of a mount system in reference to X, Y, and Z coordinates.

FIG. 15 shows a perspective view of a mount system 800 in reference to X, Y, and Z coordinates. The mount system 800 includes a housing bracket 802 having a base 804 and a first side wall 806 and a second side wall 808. The mount system 800 may also include a first bracket 810 and a second bracket 812. The first bracket 810 may have a first surface 811 adapted couple to the rear side of a monitor, and the second bracket 812 may have a second surface 813 adapted to couple to the rear side of the monitor as well. The first bracket 806 may be pivotably coupled to the first side wall 806 about a first pivot axis 814. The first side wall 806 may have a first open slot 816. The first open slot 816 may have an arc shape defined by a radius of curvature relative to the first pivot axis 814. A pin 818 may slideably couple the first bracket 810 to the first side wall 806 along the first open slot 816 such that the first bracket 810 may rotate along the YZ plane about the first pivot axis 814.

The second bracket 812 may be pivotably coupled to the second side wall 808 about a second pivot axis 810. The second side wall 808 may have a second open slot 822. The second open slot 822 may have an arc shape defined by a radius of curvature relative to the second pivot axis 814. A pin 824 may slideably couple the second bracket 812 to the second side wall 808 along the second open slot 822 such that the second bracket 812 may rotate along the YZ plane about the second pivot axis 820.

The first bracket 810 may have a first ramp 826. The first ramp 826 may have a sloping surface 828 and a non-sloping surface 830 relative to the first surface 811. Likewise, the second bracket 812 may have a second ramp 832 similar to the first ramp 826.

The mount system 800 may also include a motor 840 adapted to rotate a screw 842. A pair of anchors 4243 may rotateably couple the screw 842 to the base 802. The mount system 800 may include a sleeve 844 having a threaded opening 846 adapted to receive the screw 842 such that rotation of the screw causes the sleeve move along the longitudinal axis of the screw or Y-axis. The sleeve 844 may have a pair of arms 848 and 850. Each arm may be coupled to a wheel 852. FIG. 42 shows the mount system 800 in a first position where the wheel 852 is in contact with the non-slopping surface 830. In the first position, the first and second brackets 810 and 812 may hold the monitor in a substantially upright position.

Figure 16:
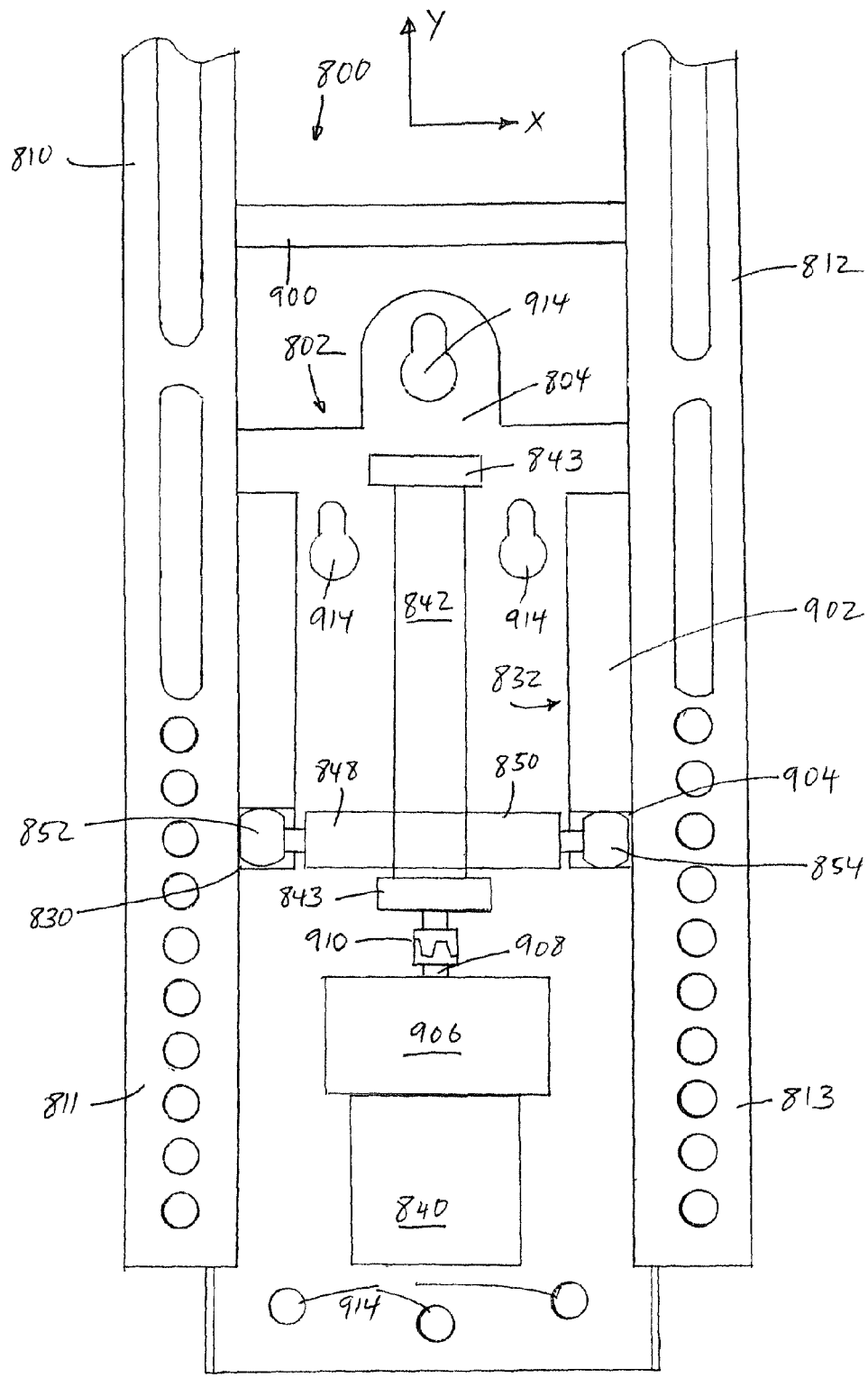
FIG. 16 is a front view of the mount system of FIG. 15.

FIG. 16 shows additional details of the mount system 800 along the XY coordinates in the first position. The two brackets 810 and 812 may be coupled to each other by a joint pin 900. The second ramp 832 may be coupled to the second bracket 812, and the second ramp may have a sloping surface 902 and a non-slopping surface 904. The motor 840 may be provided with a gear 906 to provide additional torque to the screw 842. The motor 840 may be provided with a shaft 908. A coupler 910 may be used to transfer the rotational movement of the shaft 908 to the shaft end 912 of the screw 842. The two arms 848 and 850 may be coupled to their respective first wheel 852 and second wheel 854. The base 804 of the housing bracket 802 may have a plurality of holes 914 so that the housing bracket 802 may be coupled to a supporting surface such as a wall with bolts or screws.

Figure 17:
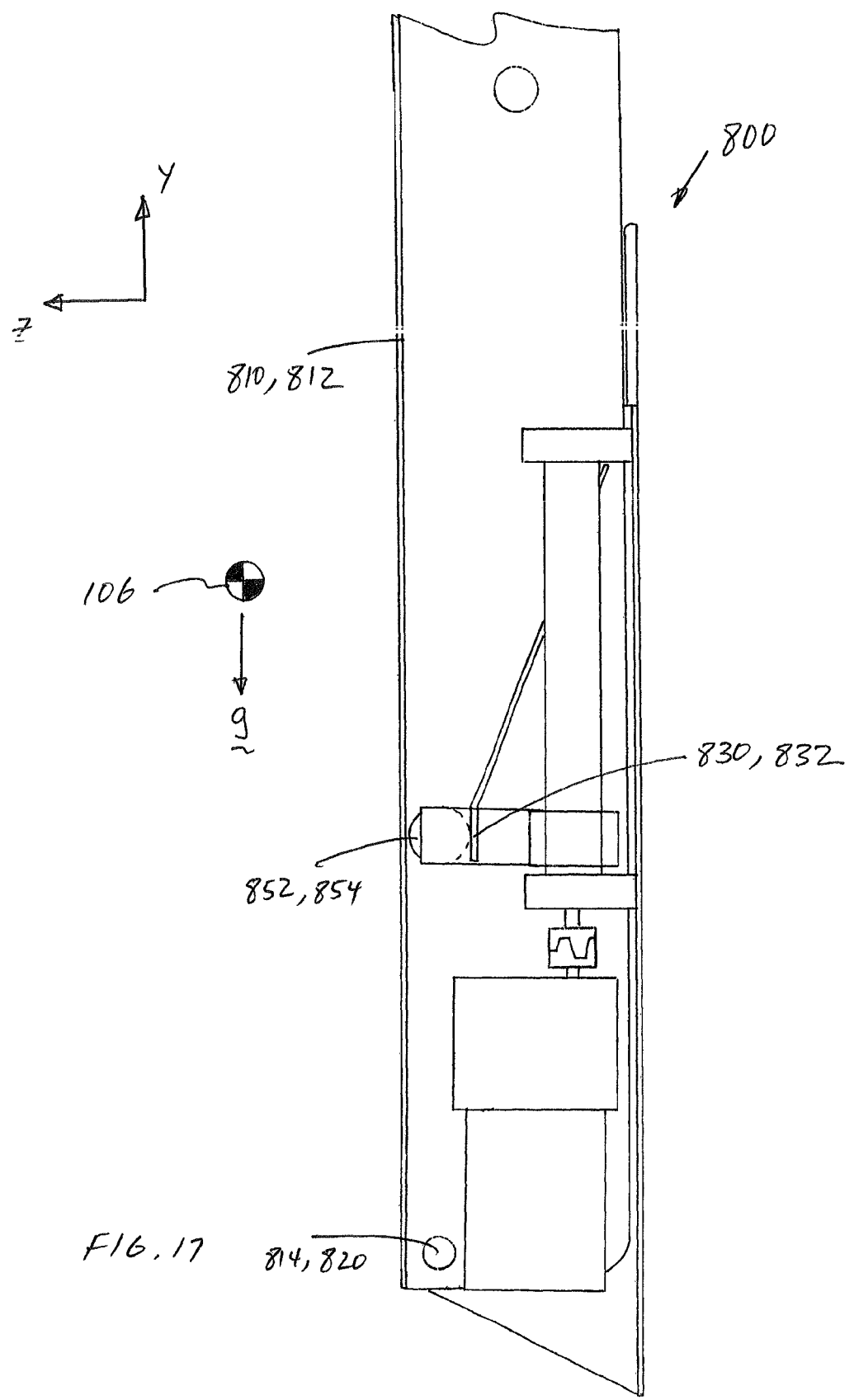
FIG. 17 is a side view of the mount system of FIG. 15 in an upright position.

FIG. 17 shows the mount system 800 along the YZ coordinates in the first position where the two wheels 852 and 854 are in contact with non-sloping surfaces 830 and 832, respectively. The center of gravity 106 may represent the weight of the monitor attached to the first and second brackets 810 and 812. As such, the natural tendency of the first and second brackets 810 and 812 are to rotate in a counter-clockwise direction about the first and second axes 814 and 820. In the first position, however, the wheels 852 and 854 in contact with the non-sloping surfaces 830 and 832 prevents the first and second brackets 810 and 812 from rotating in the counter-clockwise direction.

Figure 18:
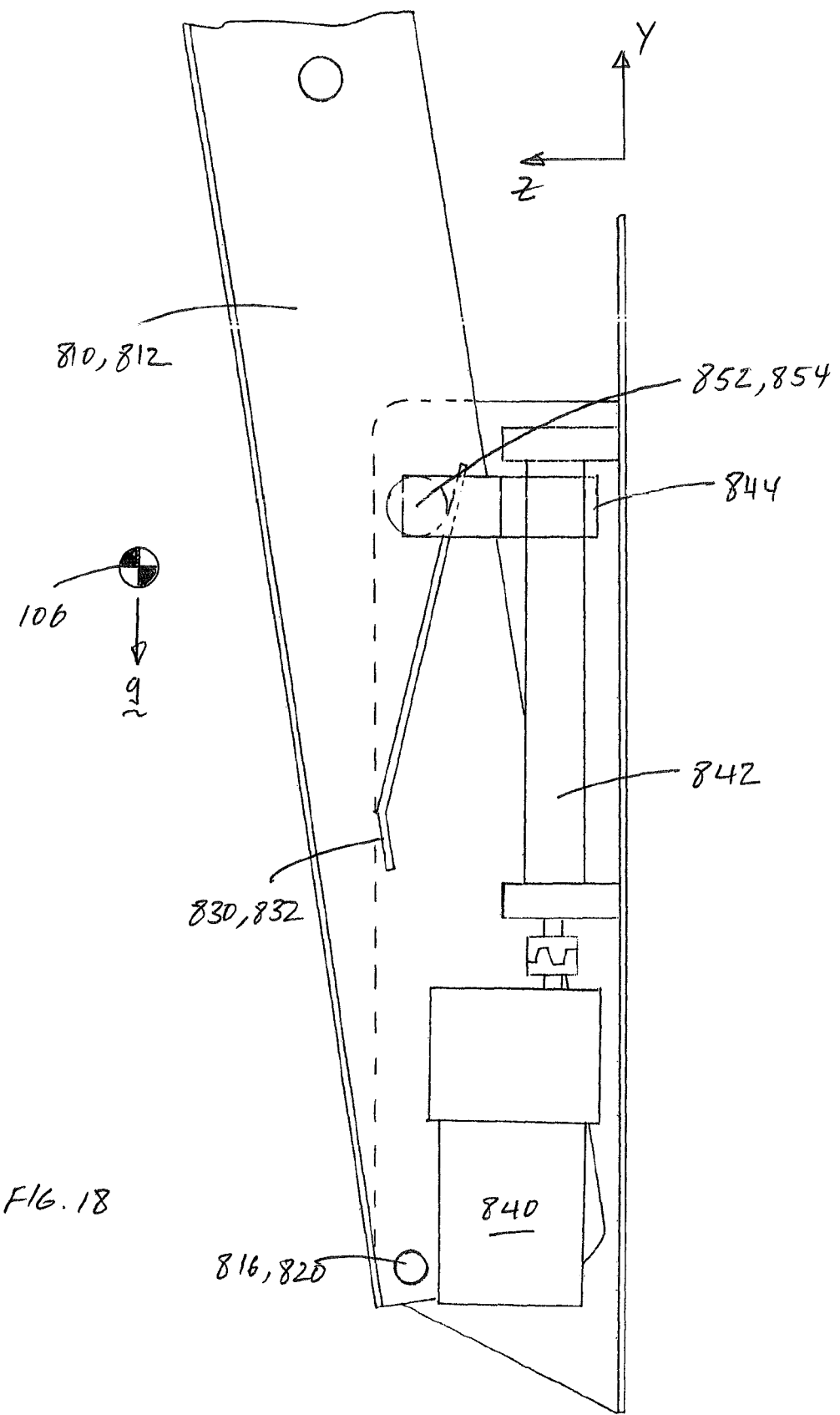
FIG. 18 is a side view of the mount system of FIG. 15 in a tilt down position.

FIG. 18 shows the mount system 800 along the YZ coordinates in a second position. As the motor 840 rotates the screw 842 to move the sleeve 844 in the positive (+) Y-axis direction, the wheels 852 and 854 move along the slopping surfaces 826 and 902, respectively. The center of gravity 106 of the monitor then causes the first and second brackets 810 and 812 to rotate in the counter-clockwise direction about the first and second axes 814 and 820. Note the distance between the center of gravity 106 of the monitor and the pivot axes 814 and 820 along the Z-axis is greater in the second position than in the first position. As such, greater force may be needed to pull the monitor upwards to the upright position. With the wheels 852 and 854 further away from the pivot axes 814 and 820 in the second position than in the first position, such leverage may be utilized to pull the monitor to the first position rather than requiring additional torque from the motor to pull the monitor to the first position.

To return the monitor to the first position, the motor rotates the screw to move the sleeve 844 in the negative (−) Y-axis direction until the wheels 852 and 854 rest on the non-slopping surfaces 830 and 832. As the monitor moves from the second position to the first position, the distance between the center of gravity 106 of the monitor and the pivot axes 814 and 820 along the Z-axis reduces as well as the distance between the wheel 852 and 854 and the pivot axes 814 and 820, and vice versa to minimize the variance in the torque required from the motor 840.

Figure 19:
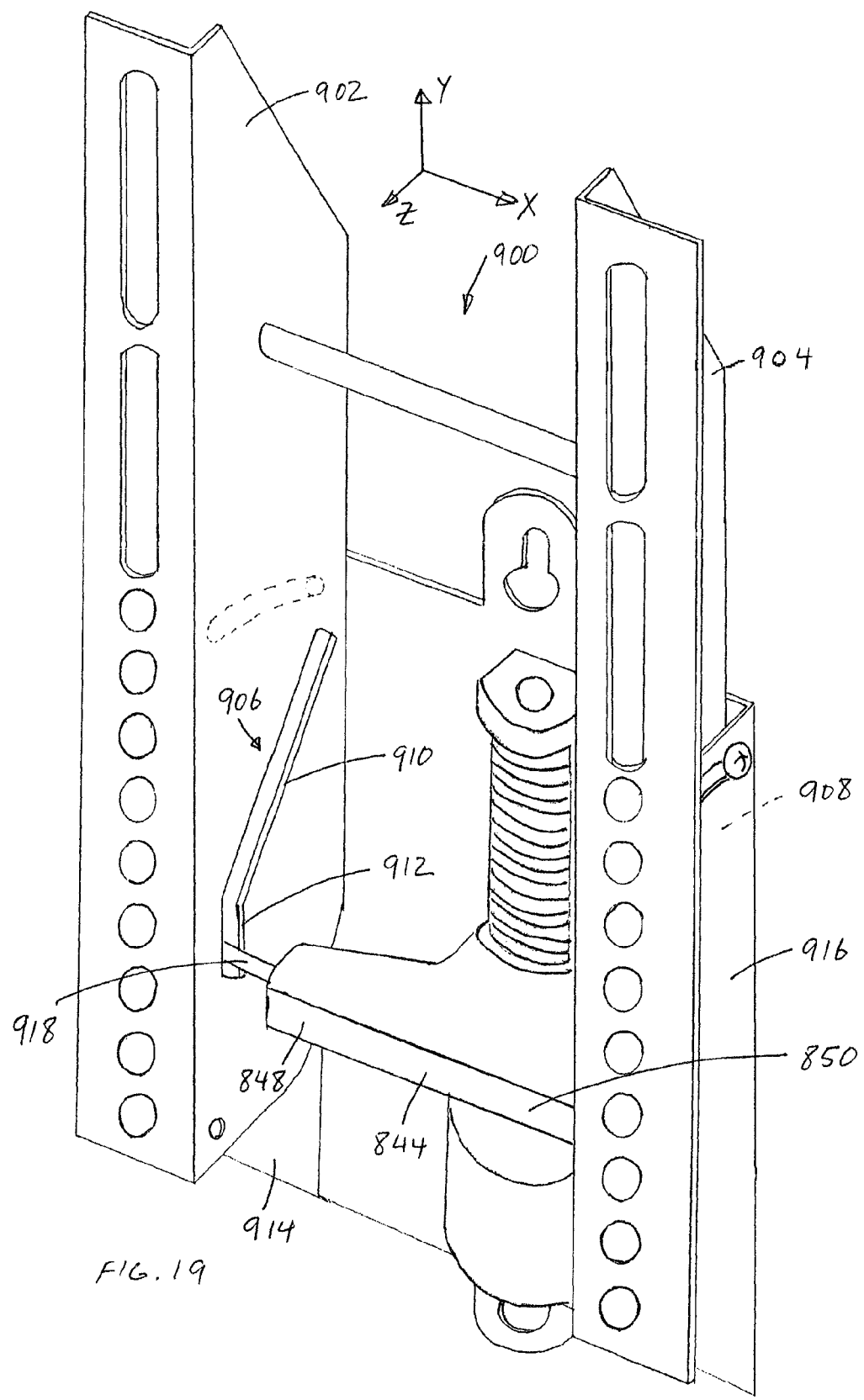
FIG. 19 shows a perspective view of another embodiment of a mount system in reference to X, Y, and Z coordinates.

FIG. 19 shows a mount system 900 in reference to X, Y, and Z coordinates. The mount system 900 is similar to the mount system 800 except that the first and second brackets 902 and 904 may have slit openings 906 and 908. Each of the slit openings may have a sloping slit 910 and a non-sloping slit 912. The mount system 900 may have side walls 914 and 916.

Figure 20:
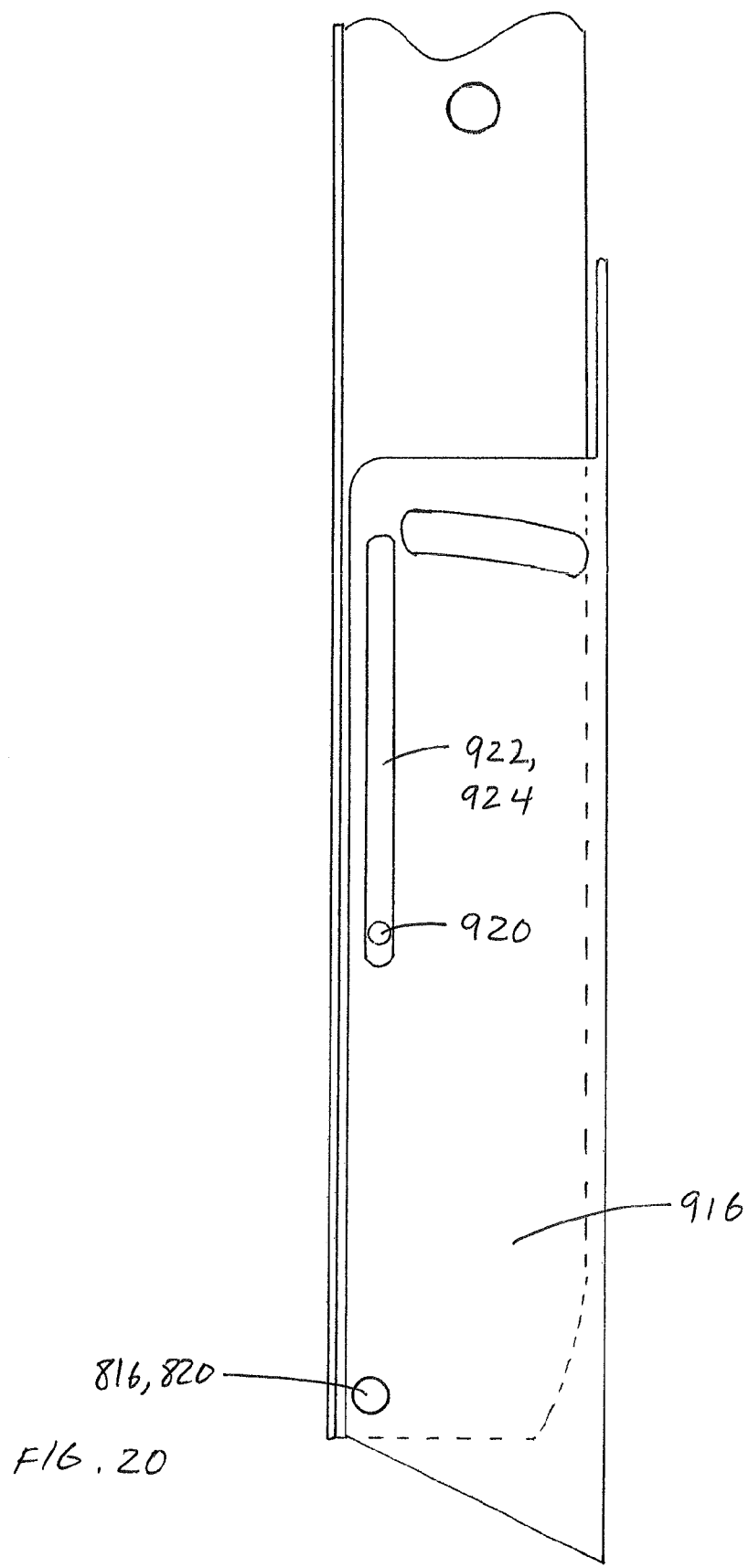
FIG. 20 is a side view of the mount system of FIG. 19 in an upright position.

FIG. 20 shows that the side wall 916 has a slot opening 922. Note that the side wall 914 also has a corresponding slot opening 924 (not shown). The two arms 848 and 850 extend to form their respective pins 918 and 920. The pin 918 passes through both the slit opening 906 and the slot opening 924 formed on the side wall 914, and the pin 920 passes through both the slit opening 908 and the slot opening 922. As such, as the sleeve moves in the positive Y-axis, the first and second brackets 902 and 904 rotate about the pivot axes 814 and 820 in a counter-clockwise direction.

Figure 21:
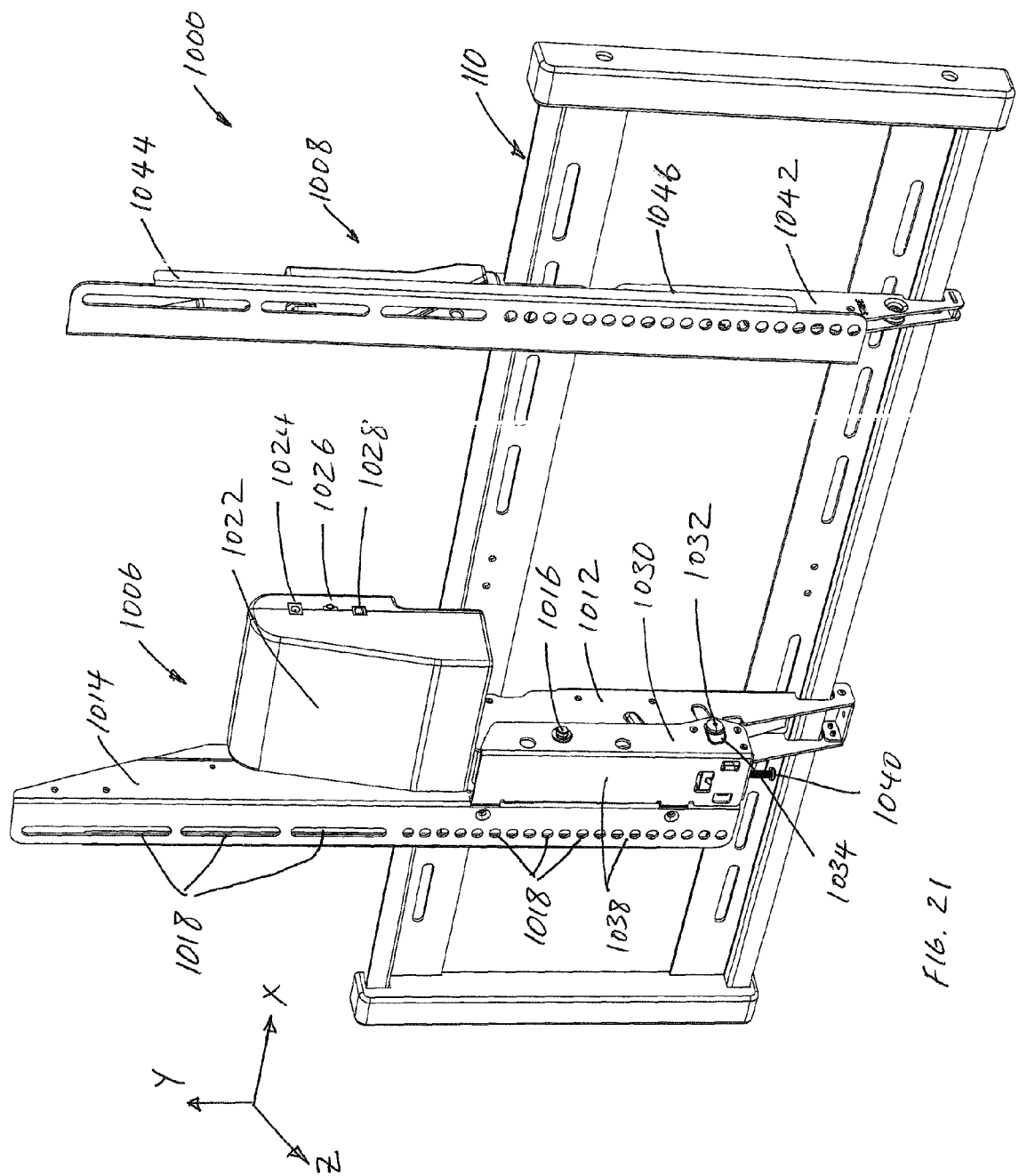
FIG. 21 shows a perspective view of a mount system in reference to X, Y, and Z coordinates.

FIG. 21 shows perspective view of a mounting system 1000 in reference to X, Y, and Z coordinates. The mount system 1000 may include a first mount bracket 1006 and a second mount bracket 1008. The first mount bracket 1006 may have a first housing bracket 1012 and a first monitor mounting bracket 1014. The first monitor mounting bracket 1014 may be pivotably coupled to the first housing bracket 1012 about a first pivot axis 1016. When the mounting system 1000 is in use, the first pivot axis 1016 may be substantially along a horizontal axis. The base 1034 of the first monitor mounting bracket 1014 may have a plurality of holes 1018 along its longitudinal axis so that one or more bolts may be used to insert through the desired holes to anchor with the threaded openings provided on the rear side of the monitor. The first housing bracket 1012 may hooks 1020 adapted to couple to the attachment bracket 110, as shown in FIG. 21.

The first mount bracket 1006 may include a control box 1022, as described in more detail below, to control the motor based on the control signal. The control box 1022 may have a first input jack 1024 to electrically connect with a power source such as a AC to DC power adapter (not shown). A second input jack 1026 may be provided to connect with an IR receiver (not shown) so that control signals from a remote control (not shown) may be received.

The control box 1022 may be also provided with a third input jack 1028 to receive input signals to detect whether the monitor is ON or OFF, and control the operation of the mounting system accordingly. Most monitors are provided with a digital optical audio output to send digital audio signals to a separate audio system. The digital audio signal is sent via LED light through an output jack on the rear side of the monitor. For energy saving purposes, the LED light is on when the monitor is ON, and the LED light is turned off when the monitor is turned OFF. As such, by detecting whether the LED light is ON or OFF, a control circuit can detect whether the monitor is ON or OFF, and operate the mounting system 1000 accordingly. To detect whether the LED light is ON or OFF, one end of an optical cable may be linked to the digital optical audio output LED jack on the rear side of the monitor, and the opposite end of the optical cable may be linked to the third input jack 1028. The control circuit may then automatically tilt down the monitor when the LED light is ON; and return the monitor to the upright position, when the LED light is OFF.

Figure 22:
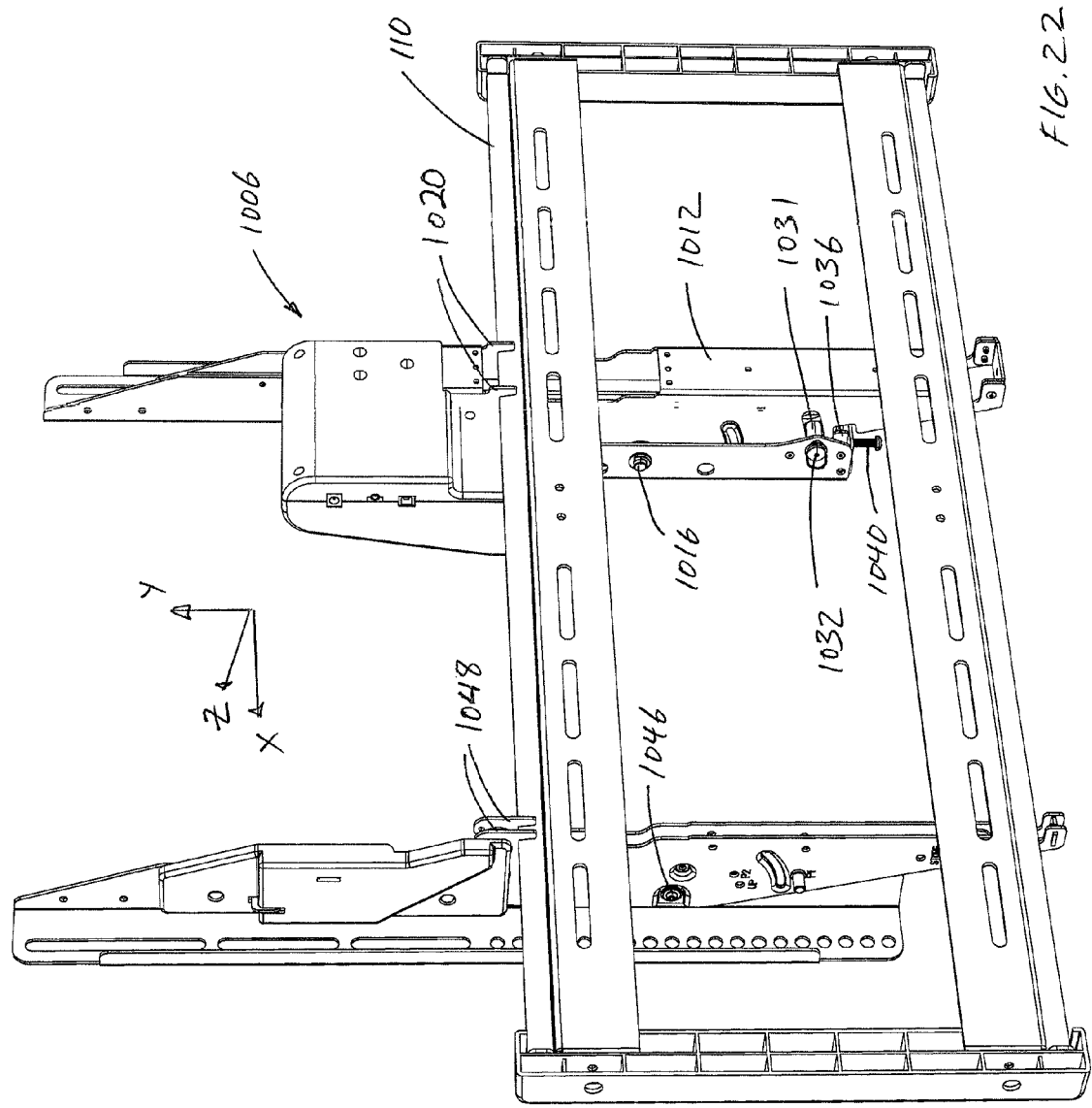
FIG. 22 shows a rear perspective view of the mount system of FIG. 21 in reference to X, Y, and Z coordinates.

The first monitor mounting bracket 1014 includes a wheel (hidden in FIG. 21) that may be coupled to the side walls 1030 adapted to rotate about an axel 1031 (shown in FIG. 22). The axel may be located along a second pivot axis 1032. The axel 1031 may be releasably engaged with an elongated opening 1034 formed within the side walls 1030. The location of the axel 1031 may be adjusted along the elongated opening 1034 and secured. A wedge 1036 (FIG. 22) may be provided between the axel 1031 and the base 1038 of the first monitor mounting bracket 1014 to adjust the location of the axel 1031 within the elongated opening 1034. The wedge 1031 may be provided with a screw 1040 so that rotating the screw 1040 can move the wedge 1031, which in turn causes the axel 1031 to move along the elongated opening 1034, thereby adjusting the location of the wheel. In the retracted position, if the wall is not vertical, then the monitor may not be in an upright position, even if the mount system 1000 was installed properly. Under such circumstances, the pitch of the base 1038 may be adjusted to a desired position by adjusting the location of the axel 1031 along the elongated opening 1034.

The second mount bracket 1008 may include a second housing bracket 1042 and a second monitor mounting bracket 1044. The second monitor mounting bracket 1044 may be pivotably coupled to the second housing bracket 1042 about a second pivot axis 1046. The second housing bracket 1042 may have hooks 1048 adapted to couple to the attachment bracket 110, as shown in FIG. 21. When the first and second mount brackets 1006 and 1008 are in use, the first pivot axis 1016 and the second pivot axis 1046 may be substantially aligned with each other along a horizontal axis, and the first mount bracket 1006 may be spaced apart from the second mount bracket 1008 along the longitudinal axis of the attachment bracket 110.

Figure 23:
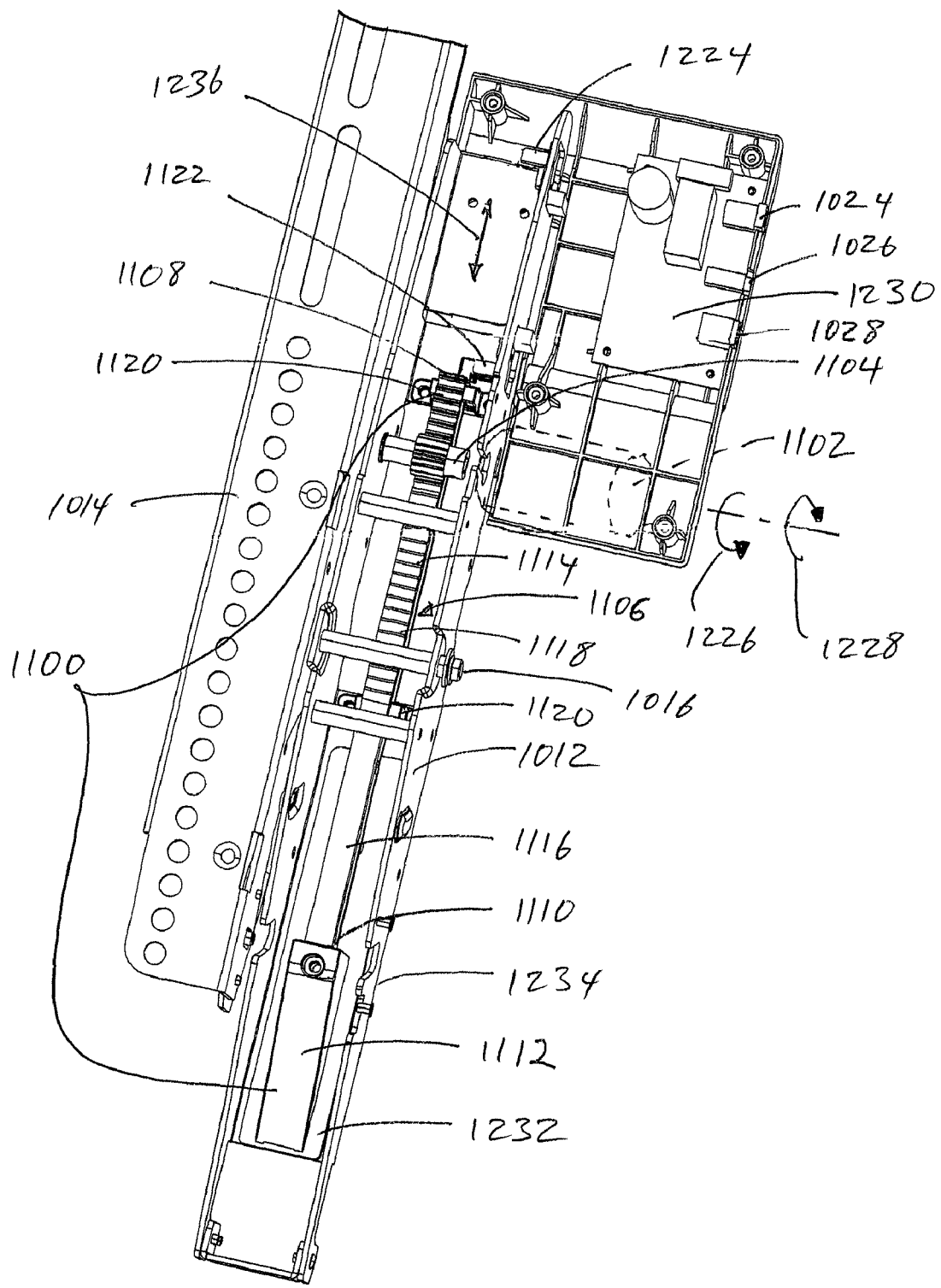
FIG. 23 show an exposed perspective view of the mount system of FIG. 21.

FIG. 23 shows an exposed perspective view of the housing 1012 and control box 1022 to show an actuator system 1100. The actuator system 1100 includes a motor (shown in dotted lines) 1102 mechanically coupled to a gear 1104 to rotate the gear 1104. The actuator system 1100 may also includes a shaft 1106 having a first end 1108 and a second end 1110. The second end 1110 may be adapted to couple to the moving block 1112. FIG. 23 shows the moving block 1102 in an extended position. The shaft 1106 may be divided into a first portion 1114 and a second portion 1116. The first portion 1114 may have gear teeth 1118 along the longitudinal axis of the shaft 1106 on one side. The gear 1104 may be adapted to engage with the teeth 1118 on the first portion 1114 of the shaft 1106 such that as the motor 1102 rotates the gear 1104, the shaft 1106 may move along its longitudinal axis, thereby moving the moving block 1112 along the longitudinal axis of the shaft 1106 as well.

The shaft 1106 may be supported by one or more guide members 1120 so that the shaft 1106 may move smoothly along its longitudinal axis. The actuator system 1100 may also include a first sensor 1122 adapted to detect the first end 1108 of the shaft 1106 at a first predetermined position such as in the extended position. The actuator system 1100 may also include a second sensor 1124 adapted to detect the first end 1108 of the shaft 1106 at a second predetermined position such as in the retracted position.

The control box 1022 includes a control circuit with the three inputs 1024, 1026, and 1028 to control the actuator system 110 as discussed above. As the motor 1102 rotates the gear 1104 in a counter-clockwise direction 1226, the shaft 1106 retracts the moving block 1112 until the second sensor 1124 detects the first end 1108 of the shaft 1106. This tilts the monitor to a down position. Conversely, as the motor 1102 rotates the gear 1104 in a clockwise direction 1228, the shaft 1106 extends the moving block 1112 until the first sensor 1122 detects the first end 1108 of the shaft 1106. This tilts the monitor upwards to an upright position. The locations of the first and second sensors 1122 and 1224 may be adjusted to adjust the tilt down and upright positions of the monitor.

A smooth plate 1232 may be provided between the bottom of the moving block 1112 and the base 1234 of the housing bracket 1012 so that the moving block 1112 may move along the longitudinal axis 1236 of the shaft 1106 smoothly to minimize the friction therebetween.

Figure 24:
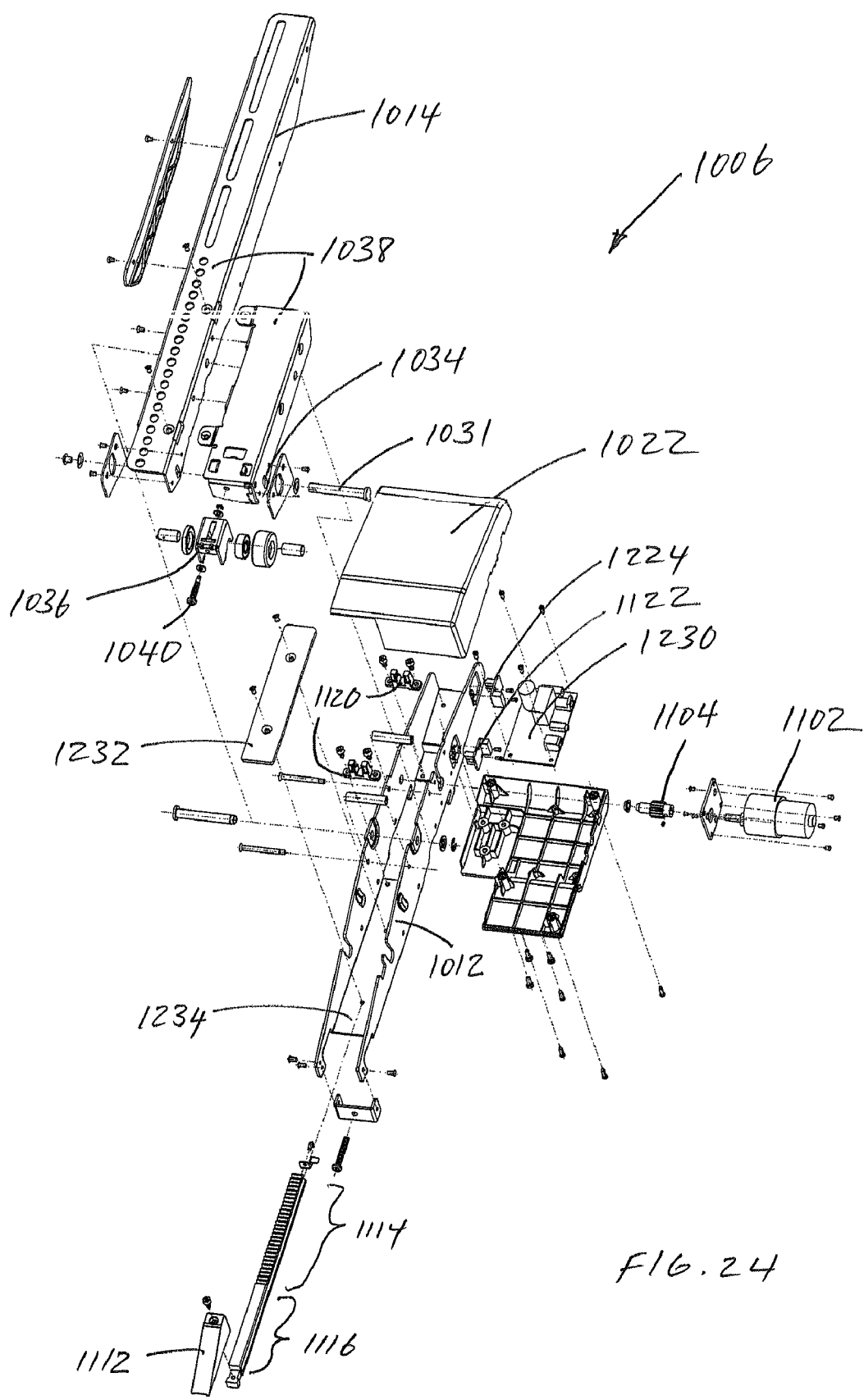
FIG. 24 shows an exploded view of a motorized mount bracket.
Figure 25:
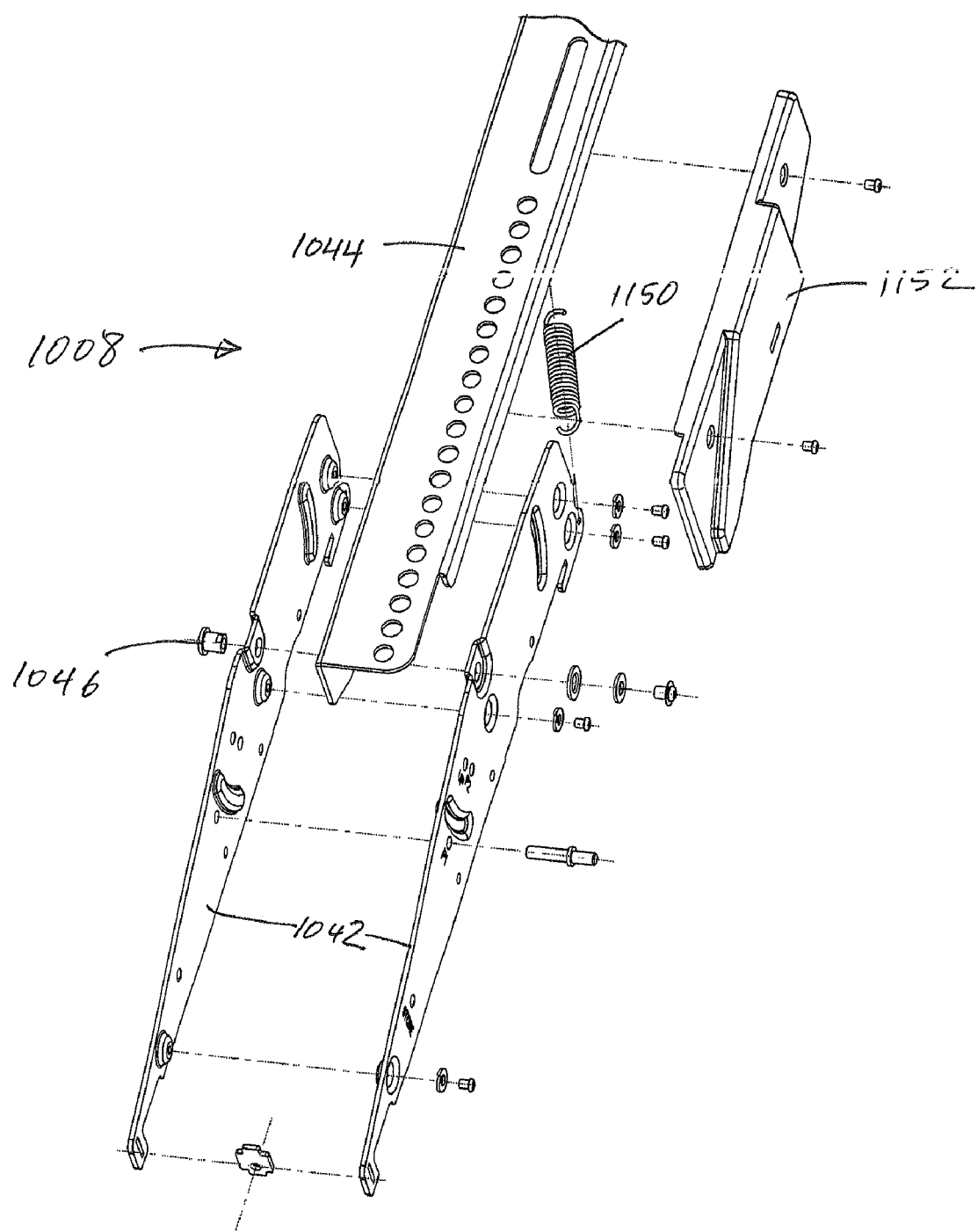
FIG. 25 shows an exploded view of a non-motorized mount bracket.

FIG. 24 shows the exploded view of the first mount bracket 1006. FIG. 25 shows the exploded view of the second mount bracket 1008. The monitor mounting bracket 1044 may be sandwiched between two housing brackets 1042. Note that a spring 1150 may be provided between the monitor mounting bracket 1044 and the housing bracket 1042 to assist the mount system lift the weight of the monitor to minimize the torque required by the motor 1102. A cover 1152 may be provided to cover the spring 1150.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A mount system adapted to pivot a monitor having a rear side, the mount system comprising:
   a first housing bracket adapted to couple to a supporting surface;
   a first monitor mounting pivotably coupled to the first housing bracket about a first pivot axis, the first monitor mounting brackets having a first end and a second end defining a first axis between the first end and the second end, the first pivot axis located between the first and second ends, the first monitor mounting bracket having a plurality of holes along the first axis adapted to couple to the rear side of the monitor, and when the mount system is in use, the first end being a bottom end and the second send being a top end; and
   a link system between the first housing and the first monitor mounting brackets, the link system having:
      a first link having a proximal end and a distal end,
      a second link having a proximal end and a distal end, the distal ends of the first and second links coupled to each other and adapted releasably support the first monitor mount bracket between the first pivot axis and the first end such that the first monitor mount bracket can pivot about the first pivot axis to separate from the link system, as the proximal ends of the first and second links move closer together, the distal ends of the first and second links extend to push the first monitor mount bracket to move the first end of the first monitor mount bracket further away from the first housing bracket, and as the proximal ends of the first and second links move away from each other, the distal ends of the first and second links retract so that the first monitor mount bracket can move closer to the first housing bracket; and
      a motor mechanically coupled to the proximal end of the first link to move the proximal ends of the first and second links relative to each other.

2. The mount system according to claim 1, including:
   a second housing bracket adapted to couple to the supporting surface;
   a second monitor mounting bracket pivotably coupled to the second housing bracket about a second pivot axis, the second monitor mounting brackets having a first end and a second end defining a second axis between the first end and the second end of the second monitor mounting bracket, the second pivot axis located between the first and second ends of the second monitor mounting bracket, the second monitor mounting bracket having a plurality of holes along the second axis adapted to couple to the rear side of the monitor, and when the mount system is in use, the first and second axes substantially aligned with respect to each other.

3. A mount system adapted to pivot a monitor having a rear side, the mount system comprising:
   an attachment bracket adapted to couple to a supporting surface, the attachment bracket having a longitudinal axis;
   a motorized mount bracket having:
      a first housing bracket and a first monitor mounting bracket, the first monitor mounting bracket adapted to pivot relative to the first housing bracket about a first pivot axis, the first monitor mounting bracket adapted to couple to the rear side of the monitor, and the first housing bracket adapted to couple to the attachment bracket, and
      a motorized actuator adapted to pivot the first monitor mounting bracket relative to the first housing bracket about the first axis; and
   a non-motorized mount bracket having a second housing bracket and a second monitor mounting bracket, the second monitor mounting bracket adapted to pivot relative to the second housing bracket about a second pivot axis, the second monitor mounting bracket adapted to couple to the rear side of the monitor, the second housing bracket adapted to couple to the attachment bracket, and when the first and second mount brackets are in use, the first axis and the second axis are substantially aligned with each other and the motorized mount bracket is spaced apart from the non-motorized mount bracket along the longitudinal axis of the attachment bracket.

4. The mount system according to claim 3, where the motorized actuator includes:
   a motor; and
   a moving block between the first housing bracket and the first monitor mounting bracket, the moving block adapted to releasably engage with the first monitor mounting bracket to push the first monitor mounting bracket to pivot about the first pivot axis, the first monitor mounting bracket separatable from the moving block, the motor coupled to the moving block to move the moving block between a first position and a second position, where in the first position, the moving block pushes the first monitor mounting bracket to be further away from the first housing bracket than in the second position.

5. The mount system according to claim 3, where the motorized actuator is a link system, the link system between the first housing bracket and the first monitor mounting bracket, the link system includes:
   a first link having a proximal end and a distal end;
   a second link having a proximal end and a distal end, the distal ends of the first and second links coupled to each other and adapted releasably engage with the first monitor mount bracket to push the first monitor mounting bracket to pivot about the first pivot axis, the first monitor mounting bracket separatable from the link system, as the proximal ends of the first and second links move closer together, the distal ends of the first and second links extend to push the first monitor mount bracket further away from the first housing bracket, and as the proximal ends of the first and second links move away from each other, the distal ends of the first and second links retract so that the first monitor mount bracket can move closer to the first housing bracket; and
   a motor mechanically coupled to the proximal end of the first link to move the proximal ends of the first and second links relative to each other.

6. A method of tilting a monitor having a rear side, the method comprising:
   supporting a first monitor mounting bracket about a first pivot axis, the first monitor mounting brackets having the first pivot axis between a first end and a second end defining a first longitudinal axis between the first end and the second end, the first monitor mounting bracket having a plurality of holes along the first longitudinal axis adapted to couple to the rear side of the monitor, and when the first monitor mounting bracket is in use the first end being a bottom end;

supporting a second monitor mounting bracket about a second pivot axis, the second monitor mounting brackets having the second pivot axis between a first end and a second end and defining a second longitudinal axis between the first end and the second end of the second monitor mounting bracket, the second monitor mounting bracket having a plurality of holes along the second longitudinal axis adapted to couple to the rear side of the monitor, and when the second monitor mounting bracket is in use the first end of the second monitor mounting bracket being a bottom end and the first and second axes substantially aligned with respect to each other substantially along a horizontal axis;

supporting the first monitor mounting bracket releasably at a first location between the first pivot axis and the first end such that when the first monitor mounting bracket is in use, the first end of the first monitor mounting bracket can be manually lifted against the weight of the monitor; and pushing the first location through a motorized action when the first monitor mounting bracket is in use to lift the first end of the first monitor mounting bracket against the weight of the monitor to pivot the first monitor mounting bracket about the first pivot axis.

\* \* \* \* \*